(12) United States Patent
Matsuda

(10) Patent No.: US 10,235,045 B2
(45) Date of Patent: Mar. 19, 2019

(54) STORAGE SYSTEM AND CONTROL APPARATUS

(71) Applicant: FUJITSU LIMITED, Kawasaki-shi, Kanagawa (JP)

(72) Inventor: Shinnosuke Matsuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 15/297,654

(22) Filed: Oct. 19, 2016

(65) Prior Publication Data
US 2017/0139598 A1    May 18, 2017

(30) Foreign Application Priority Data

Nov. 13, 2015 (JP) ................................ 2015-223045

(51) Int. Cl.
G06F 3/06 (2006.01)
G06F 11/20 (2006.01)

(52) U.S. Cl.
CPC ............ *G06F 3/0604* (2013.01); *G06F 3/068* (2013.01); *G06F 3/0653* (2013.01); *G06F 11/20* (2013.01)

(58) Field of Classification Search
CPC ........ G06F 3/0604; G06F 11/20; G06F 3/068; G06F 3/0653
See application file for complete search history.

(56) References Cited

U.S. PATENT DOCUMENTS

| | | | | | |
|---|---|---|---|---|---|
| 5,928,367 | A | * | 7/1999 | Nelson | G06F 11/1666 714/6.3 |
| 7,055,057 | B2 | * | 5/2006 | Achiwa | G06F 11/2023 711/162 |
| 7,356,581 | B2 | * | 4/2008 | Hashimoto | G06F 3/0613 709/224 |
| 8,201,020 | B2 | * | 6/2012 | Cagno | G06F 11/2089 714/11 |

FOREIGN PATENT DOCUMENTS

| | | |
|---|---|---|
| JP | 7-244642 | 9/1995 |
| JP | 8-241173 | 9/1996 |

\* cited by examiner

*Primary Examiner* — Hashim S Bhatti
(74) *Attorney, Agent, or Firm* — Fujitsu Patent Center

(57) ABSTRACT

A first control apparatus includes a first communication port that satisfies, among execution conditions about predetermined management processing, a neighboring port condition about a communication port connected to an execution apparatus that performs the management processing. The first control apparatus satisfies, among the executions conditions, a neighboring apparatus condition about a neighboring apparatus that neighbors the execution apparatus. A second control apparatus includes a second communication port that satisfies, among the execution conditions, a connection port condition about a communication port connected to the neighboring apparatus. The second control apparatus satisfies, among the execution conditions, an execution apparatus condition about the execution apparatus. The first and second communication ports of the first and second control apparatuses are connected to each other via (Continued)

a communication cable. The second control apparatus performs the management processing when the second communication port is connected to the first communication port.

6 Claims, 30 Drawing Sheets

| SIGNAL NAME | COMMUNICATION DIRECTION | DESCRIPTION |
|---|---|---|
| TXCLK | Out | CLOCK TRANSMITTED |
| TXDATA | Out | DATA TRANSMITTED |
| RXCLK | In | CLOCK RECEIVED |
| RXDATA | In | DATA RECEIVED |

FIG. 5

| PID | | SID | | TID_CNT | | TID_SET | | TID_VAL | |
|---|---|---|---|---|---|---|---|---|---|
| type | value | type | value | type | value | type | value | type | value |
| transmitted by master-1 CM | 0x01 | data | 0x7F~0x00 | subtraction transfer | 0xFE | target initial value | 0xFF~0x00 | current value | 0xFF~0x00 |
| | | | | addition transfer | 0xFD | target final value | 0xFF~0x00 | Don't care | Don't care |
| | | master notification communication | 0xFE | specified target | 0xFC | master CM numbers | 0x02,0x03,0x04 | Don't care | Don't care |
| | | WatchDog communication 1 | 0xFD | specified target | 0xFC | master CM numbers | 0x02,0x03,0x04 | Don't care | Don't care |
| | | WatchDog communication 2 | 0xFC | specified target | 0xFC | master CM numbers | 0x02,0x03,0x04 | Don't care | Don't care |
| | | WatchDog communication 3 | 0xFB | specified target | 0xFC | master CM numbers | 0x02,0x03,0x04 | Don't care | Don't care |
| | | WatchDog communication 4 | 0xFA | specified target | 0xFC | master CM numbers | 0x02,0x03,0x04 | Don't care | Don't care |
| transmitted by master-2 CM | 0x02 | data | 0x7F~0x00 | subtraction transfer | 0xFE | target initial value | 0xFF~0x00 | current value | 0xFF~0x00 |
| | | | | addition transfer | 0xFD | target final value | 0xFF~0x00 | Don't care | Don't care |
| | | master notification communication | 0xFE | specified target | 0xFC | master CM numbers | 0x02,0x03,0x04 | Don't care | Don't care |
| | | WatchDog communication 1 | 0xFD | specified target | 0xFC | master CM numbers | 0x02,0x03,0x04 | Don't care | Don't care |
| | | WatchDog communication 2 | 0xFC | specified target | 0xFC | master CM numbers | 0x02,0x03,0x04 | Don't care | Don't care |
| | | WatchDog communication 3 | 0xFB | specified target | 0xFC | master CM numbers | 0x02,0x03,0x04 | Don't care | Don't care |
| | | WatchDog communication 4 | 0xFA | specified target | 0xFC | master CM numbers | 0x02,0x03,0x04 | Don't care | Don't care |

FIG. 11

| PID | | SID | | TID_CNT | | TID_SET | | TID_VAL | |
|---|---|---|---|---|---|---|---|---|---|
| type | value | type | value | type | value | type | value | type | value |
| transmitted by master-3 CM | 0x03 | data | 0x7F~0x00 | subtraction transfer | 0xFE | target initial value | 0xFF~0x00 | current value | 0xFF~0x00 |
| | | master notification communication | 0xFE | addition transfer | 0xFD | target final value | 0xFF~0x00 | Don't care | Don't care |
| | | WatchDog communication 1 | 0xFD | specified target | 0xFC | master CM numbers | 0x02,0x03,0x04 | Don't care | Don't care |
| | | WatchDog communication 2 | 0xFC | specified target | 0xFC | master CM numbers | 0x02,0x03,0x04 | Don't care | Don't care |
| | | WatchDog communication 3 | 0xFB | specified target | 0xFC | master CM numbers | 0x02,0x03,0x04 | Don't care | Don't care |
| | | WatchDog communication 4 | 0xFA | specified target | 0xFC | master CM numbers | 0x02,0x03,0x04 | Don't care | Don't care |
| transmitted by master-4 CM | 0x04 | data | 0x7F~0x00 | subtraction transfer | 0xFE | target initial value | 0xFF~0x00 | current value | 0xFF~0x00 |
| | | master notification communication | 0xFE | addition transfer | 0xFD | target final value | 0xFF~0x00 | Don't care | Don't care |
| | | WatchDog communication 1 | 0xFD | specified target | 0xFC | master CM numbers | 0x02,0x03,0x04 | Don't care | Don't care |
| | | WatchDog communication 2 | 0xFC | specified target | 0xFC | master CM numbers | 0x02,0x03,0x04 | Don't care | Don't care |
| | | WatchDog communication 3 | 0xFB | specified target | 0xFC | master CM numbers | 0x02,0x03,0x04 | Don't care | Don't care |
| | | WatchDog communication 4 | 0xFA | specified target | 0xFC | master CM numbers | 0x02,0x03,0x04 | Don't care | Don't care |

FIG. 12

| MASTER NAME | MONITORING TARGET |
|---|---|
| MASTER 1 | MASTER 2 |
| MASTER 2 | MASTER 1 |
| MASTER 3 | MASTER 1 |
| MASTER 4 | MASTER 2 |

FIG. 19

| MASTER LEVEL | MALFUNCTIONING MASTER | | | |
|---|---|---|---|---|
| | MASTER 1 | MASTER 2 | MASTER 3 | MASTER 4 |
| MASTER 1 | Degrade | keep | keep | keep |
| MASTER 2 | Failover → MASTER 1 | Degrade | keep | keep |
| MASTER 3 | Failover → MASTER 2 | keep | Degrade | keep |
| MASTER 4 | Failover → MASTER 3 | Failover → MASTER 2 | keep | Degrade |

FIG. 20

| MASTER LEVEL | TWO MALFUNCTIONING MASTERS | | | |
|---|---|---|---|---|
| | MASTERS 1 AND 3 | MASTERS 2 AND 4 | MASTERS 1 AND 2 | MASTERS 3 AND 4 |
| MASTER 1 | Degrade | keep | Degrade | keep |
| MASTER 2 | Failover → MASTER 1 | Degrade | Degrade | keep |
| MASTER 3 | Degrade | Failover → MASTER 2→ (B) MASTER 2 | Failover → MASTER 1 | Degrade |
| MASTER 4 | Failover → MASTER 2→ (A) MASTER 2 | Degrade | Failover → MASTER 2 | Degrade |

FIG. 21

STORAGE SYSTEM AND CONTROL APPARATUS

CROSS-REFERENCE TO RELATED APPLICATION

This application is based upon and claims the benefit of priority of the prior Japanese Patent Application No. 2015-223045, filed on Nov. 13, 2015, the entire contents of which are incorporated herein by reference.

FIELD

The embodiments discussed herein relate to a storage system and a control apparatus.

BACKGROUND

When the memory capacity or performance of a storage system becomes insufficient, for example, a scale-out architecture is applied to the storage system. For example, a device enclosure (DE) including a plurality of hard disks and a controller enclosure (CE) are added to the storage system. The CE includes a plurality of controller modules (CMs). Each of the CMs is connected to the hard disks. When a host device requests access to one of the hard disks, a corresponding CM controls the access to the hard disk.

Among the storage systems, there is a scale-out-type storage system to which a storage device is easily added. In this scale-out-type storage system, for example, an individual service controller (SVC) provided in a device called a front end controller (FE) manages CMs. For example, each of the CMs is connected to an SVC via a management bus. The SVC communicates with each of the CMs via a management bus, so as to manage operations of the CMs. For example, the SVC controls power supplies of the CMs, monitors statuses of the CMs, and acquires logs from the CMs. In addition, the SVC performs reset control and turns on and off light emitting diodes (LED), for example.

Various techniques are used to manage a storage system. For example, there is a system that is configured to maintain consistency of file management information. In this system, a master secondary storage control device per file is selected and determined from a plurality of secondary storage control devices by using a random number and a modulo operation. There is also a system that promptly performs accurate failure recovery when a control device or a memory in a disk storage system malfunctions. In this system, the failure recovery is performed by using mirror-type memories that synchronize with each other in real time in two control devices.

See, for example, Japanese Laid-open Patent Publication Nos. 07-244642 and 08-241173.

In a conventional scale-out-type storage system, an SVC manages CMs. Thus, when this SVC malfunctions, the system cannot be operated properly. Thus, to improve reliability, two SVCs are included in an FE. If there are two SVCs, even when one of the SVCs malfunctions, the other SVC can properly manage the CMs. However, if two SVCs are used, the size of the FE is increased. As a result, more space is needed to install the FE, and the cost is also increased.

One possible solution to this problem is to eliminate the SVCs and allow one of the plurality of CMs to manage all the CMs. If one of the CMs is allowed to manage all the CMs, no SVCs are needed in a scale-out-type storage system. Consequently, less space is needed for the installation of the system. However, even when each of the CMs is provided with the same management function as that of an SVC, it has conventionally been impossible to determine which one of the plurality of CMs needs to be the management CM. Thus, it is difficult to eliminate the SVCs and allow one of the plurality of CMs to manage all the CMs.

Each of the CMs in the above description is an example of a control device that controls storage devices. Regarding general control devices, as is the case with the CMs, it is impossible to determine which one of a plurality of control devices needs to be allowed to manage all the control devices.

SUMMARY

According to one aspect, there is provided a storage system including: a storage apparatus; a first control apparatus which controls the storage apparatus, which includes a first communication port satisfying, among execution conditions about predetermined management processing, a neighboring port condition about a communication port connected to an execution apparatus that performs the management processing, and which satisfies, among the execution conditions, a neighboring apparatus condition about a neighboring apparatus that neighbors the execution apparatus; a second control apparatus which controls the storage apparatus, which includes a second communication port that satisfies, among the execution conditions, a connection port condition about a communication port connected to the neighboring apparatus, which satisfies, among the execution conditions, an execution apparatus condition about the execution apparatus, and which determines that the execution conditions are satisfied and performs the management processing when the second communication port is connected to the first communication port; and a communication cable that connects the first communication port of the first control apparatus and the second communication port of the second control apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of signals used in communication between CMs;

FIG. 11 illustrates examples of data in control packets transmitted by "master 1" and "master 2";

FIG. 12 illustrates examples of data in control packets transmitted by "master 3" and "master 4";

FIG. 19 illustrates an example of monitoring targets;

FIG. 20 illustrates an example of failover processing performed when a master CM malfunctions;

FIG. 21 illustrates an example of failover processing performed when two master CMs malfunction;

DESCRIPTION OF EMBODIMENTS

Figure 1:
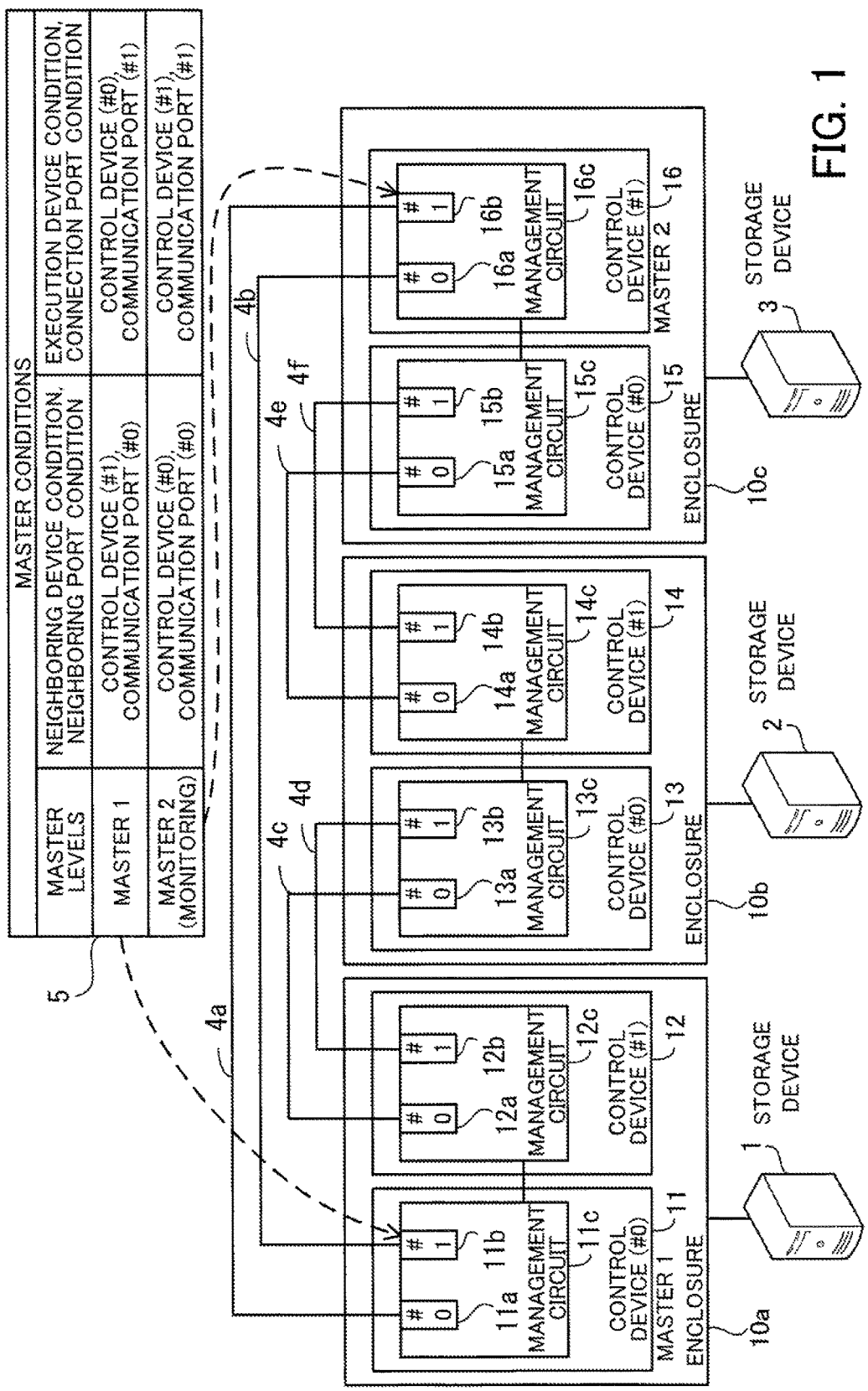
FIG. 1 illustrates an example of a configuration of a storage system according to a first embodiment.

Embodiments will be described below in detail with reference to the accompanying drawings, wherein like reference characters refer to like elements throughout.

First Embodiment

First, a first embodiment will be described.

FIG. 1 illustrates an example of a configuration of a storage system according to a first embodiment. The storage system includes a plurality of storage devices 1 to 3 and enclosures 10a to 10c connected to the storage devices 1 to 3, respectively.

The enclosure 10a includes a control device 11 whose device number is "0" and a control device 12 whose device number is "1." The control device 11 includes a management circuit 11c including a communication port 11a whose port number is "0" and a communication port 11b whose port number is "1." The control device 12 includes a management circuit 12c including a communication port 12a whose port number is "0" and a communication port 12b whose port number is "1." The management circuit 11c and the management circuit 12c are connected to each other via a signal line in the enclosure 10a.

The enclosure 10b includes a control device 13 whose device number is "0" and a control device 14 whose device number is "1." The control device 13 includes a management circuit 13c including a communication port 13a whose port number is "0" and a communication port 13b whose port number is "1." The control device 14 includes a management circuit 14c including a communication port 14a whose port number is "0" and a communication port 14b whose port number is "1." The management circuit 13c and the management circuit 14c are connected to each other via a signal line in the enclosure 10b.

The enclosure 10c includes a control device 15 whose device number is "0" and a control device 16 whose device number is "1." The control device 15 includes a management circuit 15c including a communication port 15a whose port number is "0" and a communication port 15b whose port number is "1." The control device 16 includes a management circuit 16c including a communication port 16a whose port number is "0" and a communication port 16b whose port number is "1." The management circuit 15c and the management circuit 16c are connected to each other via a signal line in the enclosure 10c.

Each of the control devices 11 to 16 controls access to a corresponding one of the storage devices 1 to 3. The device number of a control device (any one of the control devices 11 to 16) is an identifier used in the corresponding enclosure (the corresponding one of the enclosures 10a to 10c) in which this control device is included.

Each of the communication ports 11a to 16b is a port connected to a corresponding one of communication cables 4a to 4f, each of which is used for communication between control devices in different enclosures. The port number of a communication port (any one of the communication ports 11a to 16b) is an identifier used in the corresponding control device (the corresponding one of the control devices 11 to 16) in which this communication port is included.

The communication cable 4a connects the communication port 11a of the control device 11 and the communication port 16b of the control device 16. The communication cable 4b connects the communication port 11b of the control device 11 and the communication port 16a of the control device 16. The communication cable 4c connects the communication port 12a of the control device 12 and the communication port 13a of the control device 13. The communication cable 4d connects the communication port 12b of the control device 12 and the communication port 13b of the control device 13. The communication cable 4e connects the communication port 14a of the control device 14 and the communication port 15a of the control device 15. The communication cable 4f connects the communication port 14b of the control device 14 and the communication port 15b of the control device 15.

The control devices 11 to 16 include a storage device holding master conditions 5. The master conditions 5 include execution conditions about a device that performs predetermined management processing and monitoring execution conditions about a device that monitors the device that performs the management processing.

For example, the execution conditions include a neighboring port condition, a neighboring device condition, a connection port condition, and an execution device condition. The neighboring port condition is about a communication port connected to the execution device that performs the management processing. The neighboring device condition is about a neighboring device that neighbors the execution device. The connection port condition is about a communication port connected to the neighboring device. The execution device condition is about the execution device.

For example, the monitoring execution conditions include a monitoring neighboring port condition, a monitoring neighboring device condition, a monitoring connection port condition, and a monitoring device condition. The monitoring neighboring port condition is about a communication port connected to the monitoring device that executes the monitoring processing. The monitoring neighboring device condition is about a monitoring neighboring device that neighbors the monitoring device. The monitoring connection port condition is about a communication port connected to the monitoring neighboring device. The monitoring device condition is about the monitoring device.

For example, each of the neighboring port condition and the monitoring neighboring port condition is about a port number that identifies a communication port within a device. For example, each of the neighboring device condition and monitoring neighboring device condition is about an identification number that identifies a device within an enclosure. For example, each of the connection port condition and the monitoring connection port condition is about a port number that identifies a communication port within a device. For example, each of the execution device condition and the monitoring device condition is about an identification number that identifies a device within an enclosure.

Hereinafter, the control device that performs the management processing will be referred to as "master 1" and the control device that monitors the management device will be referred to as "master 2." In the example in FIG. 1, the conditions (execution conditions) to serve as the master-1 control device are defined. Namely, the device number of a control device that neighbors the master-1 control device needs to be "1," and the communication port number of a communication port of the neighboring device connected to the master-1 control device needs to be "0." In addition, the device number of the master-1 control device needs to be "0," and the port number of a communication port of the master-1 control device connected to the neighboring control device needs to be "1."

In addition, the conditions (monitoring execution conditions) to serve as the master-2 control device are defined. Namely, the device number of the control device that neighbors the monitoring control device needs to be "0," and the communication port number of the communication port of the neighboring device connected to the monitoring control device needs to be "0." In addition, the device number of the monitoring control device needs to be "1," and the port number of the communication port connected to the neighboring control device needs to be "1."

The communication cables 4a to 4f are connected in such a manner that one of the plurality of control devices 11 to 16 serves as the master-1 control device, and another control device serves as the master-2 control device. In the example in FIG. 1, the control device 11 serves as the master-1 control device, and the control device 16 serves as the master-2 control device.

According to the first embodiment, each of the control devices 11 to 16 is able to determine whether to serve one of the masters by itself. For example, each of the control devices 11 to 16 determines, per communication port, whether a combination of its device number and the port number of a communication port and a combination of the device number of the control device to which the communication port is connected and the port number of the destination communication port satisfy the conditions to serve as the master-1 control device. If a control device determines that the control device has a communication port satisfying the conditions to serve as the master-1 control device, this control device determines to manage all the control devices 11 to 16. This determination of whether to serve as the master-1 control device is made by each of the management circuits 11c to 16c in the control devices 11 to 16, for example.

Likewise, each of the control devices 11 to 16 determines, per communication port, whether a combination of its device number and the port number of a communication port and a combination of the device number of the control device to which the communication port is connected and the port number of the destination communication port satisfy the conditions to serve as the master-2 control device. If a control device determines that the control device has a communication port satisfying the conditions to serve as the master-2 control device, this control device determines to monitor the master-1 control device. If the master-1 control device malfunctions, the master-2 control device switches to serve as the master-1 control device and manages all the control devices 11 to 16.

The communication cables 4a to 4f are connected in such a manner that a control device to which an end of only one of the communication cables 4a to 4f is connected satisfies the conditions to serve as the master-1 control device. The other cables are connected so as not to satisfy the conditions to serve as the master-1 control device.

In this way, in the first embodiment, on the basis of the connection state of the communication cables 4a to 4f, a single master-1 control device and a single master-2 control device are determined. In addition, each of the control devices 11 to 16 is able to easily determine whether to serve as the master-1 or master-2 control device by itself, on the basis of the connection state of the communication cables 4a to 4f. As a result, since external management devices such as SVCs are not needed, downsizing of the entire system is achieved.

In addition, if the master-1 control device malfunctions, since the master-2 control device promptly switches to serve as the master-1 control device and starts managing the control devices 11 to 16, the reliability of the system is maintained at a high level.

Second Embodiment

Next, a second embodiment will be described. In a scale-out-type storage system according to a second embodiment, a management FPGA is arranged in an individual CM, and an individual management FPGA manages its corresponding CM without involving an SVC or a processor in the CM. Since SVCs are not needed, downsizing of the storage system is achieved.

Figure 2:
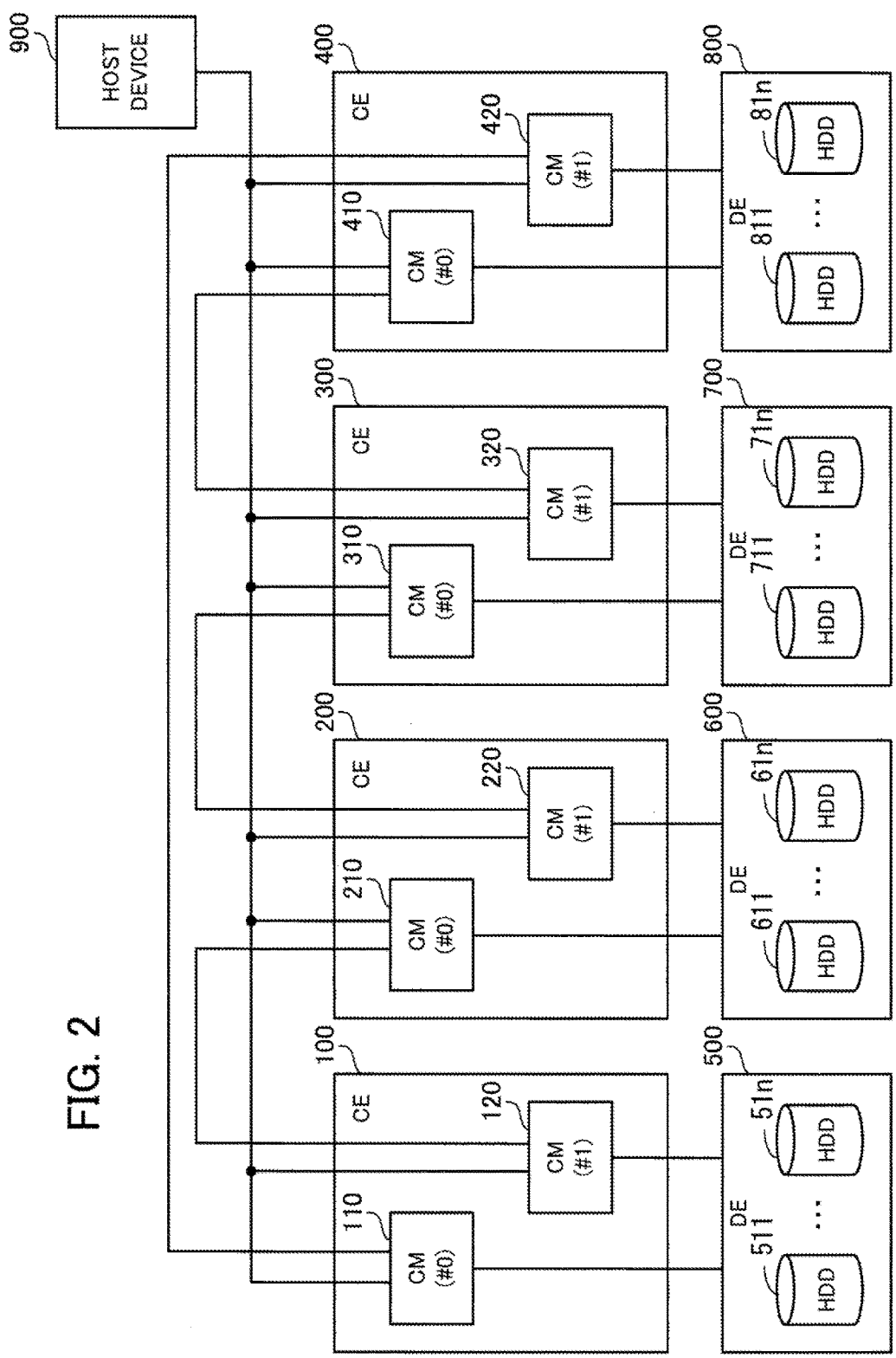
FIG. 2 illustrates an example of a configuration of a storage system according to a second embodiment.

FIG. 2 illustrates an example of a configuration of a storage system according to the second embodiment. The storage system illustrated in FIG. 2 includes CEs 100, 200, 300, and 400, DEs 500, 600, 700, and 800, and a host device 900. The host device 900 performs data input and output operations on hard disk drives (HDDs) in the DEs 500, 600, 700, and 800 via the CEs 100, 200, 300, and 400.

The CE 100 includes CMs 110 and 120. The CE 200 includes CMs 210 and 220. The CE 300 includes CMs 310 and 320. The CE 400 includes CMs 410 and 420. Each of the CMs 110, 120, 210, 220, 310, 320, 410, and 420 is provided with an identification number (CM number) used in the corresponding one of the CEs 100, 200, 300, and 400. The CM number of the CMs 110, 210, 310, and 410 is "0," and the CM number of the CMs 120, 220, 320, and 420 is "1."

The CM 110 and the CM 420 are connected to each other. The CM 120 and the CM 210 are connected to each other. The CM 220 and the CM 310 are connected to each other. The CM 320 and the CM 410 are connected to each other. For example, two CMs are connected to each other via serial cables.

In addition, the CMs 110, 120, 210, 220, 310, 320, 410, and 420 are connected to the host device 900. For example, the CM 110, 120, 210, 220, 310, 320, 410, and 420 are connected to the host device 900 via a storage area network (SAN) using Fibre Channel (FC) or Internet Small Computer System Interface (iSCSI). In FIG. 2, as an example, the single host device 900 is connected to the CMs 110, 120, 210, 220, 310, 320, 410, and 420. However, for example, each of a plurality of host devices may be connected to one or more CMs.

Each of the DEs 500, 600, 700, and 800 is a disk array device including a plurality of storage devices. For example, the DE 500 includes HDDs 511 to 51*n*. The DE 600 includes HDDs 611 to 61*n*. The DE 700 includes HDDs 711 to 71*n*. The DE 800 includes HDDs 811 to 81*n*. In the example in FIG. 2, the DEs 500, 600, 700, and 800 include HDDs as the storage devices. However, the DEs 500, 600, 700, and 800 may include a different kind of storage devices such as solid state drives (SSDs).

The CMs 110 and 120 are connected to the DE 500. The CMs 110 and 120 control access to the HDDs 511 to 51*n* included in the DE 500, in response to a request from the host device 900 or another CM. The CMs 210 and 220 are connected to the DE 600. The CMs 210 and 220 control access to the HDDs 611 to 61*n* included in the DE 600, in response to a request from the host device 900 or another CM. The CMs 310 and 320 are connected to the DE 700. The CMs 310 and 320 control access to the HDDs 711 to 71*n* included in the DE 700, in response to a request from the host device 900 or another CM. The CMs 410 and 420 control access to the HDDs 811 to 81*n* included in the DE 800, in response to a request from the host device 900 or another CM.

For example, the CE 100 and the DE 500 are realized as a storage apparatus included in a single enclosure. The same applies to the CE 200 and the DE 600, the CE 300 and the DE 700, and the CE 400 and the DE 800. The storage system in FIG. 2 can be expanded by adding a storage apparatus as a unit.

In addition, the number of CEs included in the storage system is not limited to 4. The number of CMs included in an individual CE is not limited to 2, either. For example, the storage system may include more than four CEs each including more than two CMs.

Figure 3:
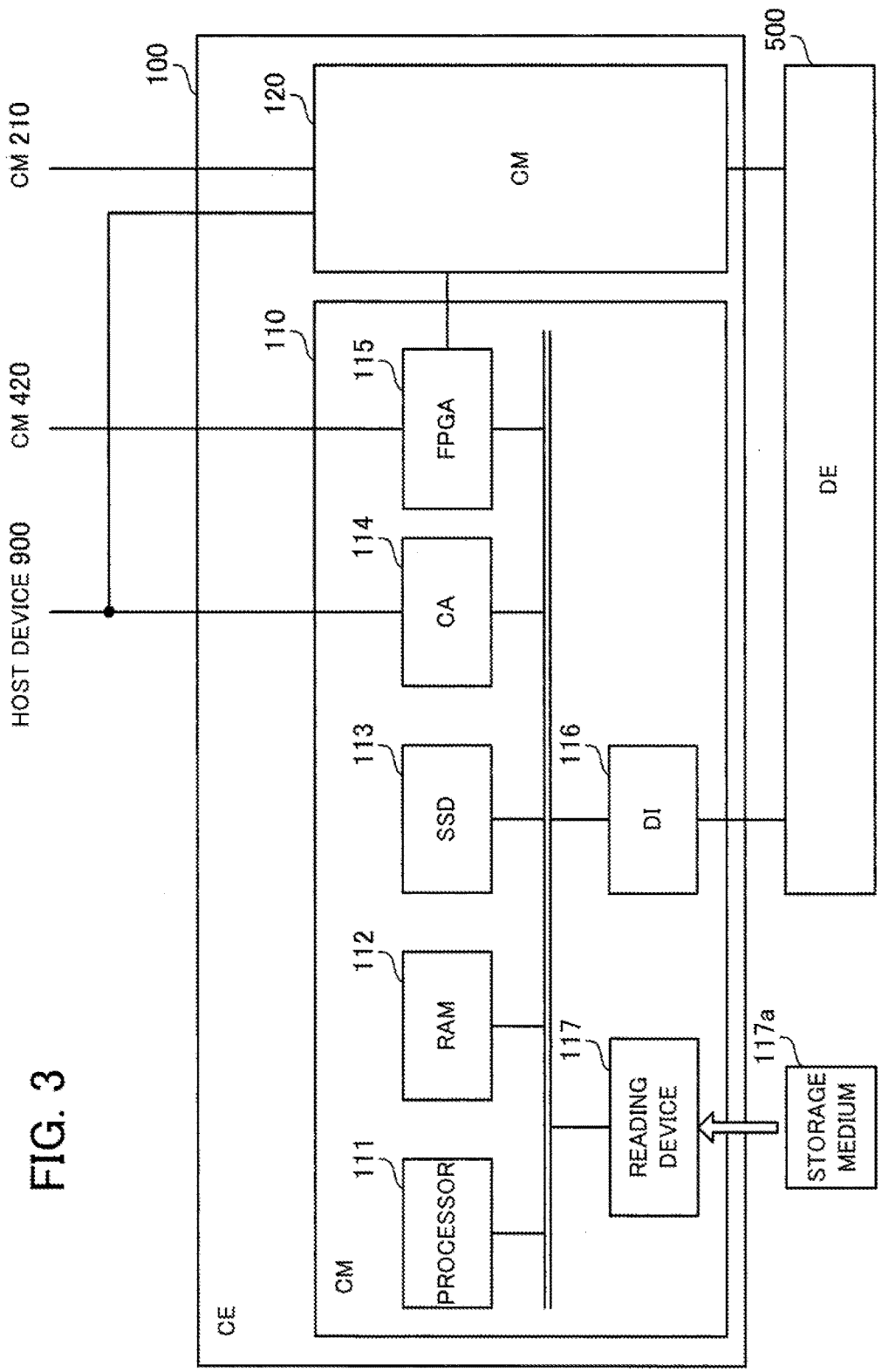
FIG. 3 illustrates an example of a hardware configuration of an individual CM.

FIG. 3 illustrates an example of a hardware configuration of the CM 110. The CM 110 includes a processor 111, a random access memory (RAM) 112, an SSD 113, a channel adapter (CA) 114, an FPGA 115, a device interface (DI) 116, and a reading device 117.

The processor 111 controls information processing of the CM 110. Examples of the processor 111 include a central processing unit (CPU), a digital signal processor (DSP), and an application specific integrated circuit (ASIC). The processor 111 may be a multiprocessor that includes a plurality of processing elements.

The RAM 112 is a main storage device of the CM 110. The RAM 112 temporarily holds at least a part of a program of an operating system (OS) or an application program executed by the processor 111. In addition, the RAM 112 holds various types of data used in processing performed by the processor 111.

The SSD 113 is an auxiliary storage device of the CM 110. The SSD 113 is a non-volatile semiconductor memory. The SSD 113 holds an OS program, a firmware program, an application program, and various types of data. The CM 110 may include an HDD in place of the SSD 113 as the auxiliary storage device.

The CA 114 is an interface for communicating with the host device 900. When the host device 900 transmits an access request, the CA 114 receives and transfers the access request to the processor 111.

The FPGA 115 is an integrated circuit whose internal logic circuit can be defined or changed after manufactured. The FPGA 115 is connected to the CM 120 in the CE 100 via a management bus. The FPGA 115 is also connected to the CM 420 in the CE 400 via management buses. The FPGA 115 communicates with the CMs 120 and 420 via the respective management buses, and the CM 110 determines whether to serve as a master that manages all the CMs. If the CM 110 determines to serve as the master, the FPGA 115 manages the other CMs via the management buses.

When a "direct current (DC)-ON" instruction is given, the entire CM 110 is supplied with power. However, when a CE is supplied with alternating current (AC) power, only the FPGA 115 is supplied with the power. When receiving a DC-ON instruction, the FPGA 115 starts to supply power to the entire CM 110.

The DI 116 is an interface for communicating with the DE 500. The reading device 117 reads a program or data held in a portable storage medium 117*a*. Examples of the storage medium 117*a* include a magnetic disk such as a flexible disk (FD) or an HDD, an optical disc such as a compact disc (CD) or a digital versatile disc (DVD), and a magneto-optical disk (MO). For example, a non-volatile semiconductor memory such as a flash memory card may be used as the storage medium 117*a*. For example, in accordance with an instruction from the processor 111, the reading device 117 transmits a program or data read out from the storage medium 117*a* to the processor 111.

The other CMs 120, 210, 220, 310, 320, 410, and 420 may be realized by using the same hardware configuration as that of the CM 110.

Next, communication ports in the FPGA 115 will be described in detail.

Figure 4:
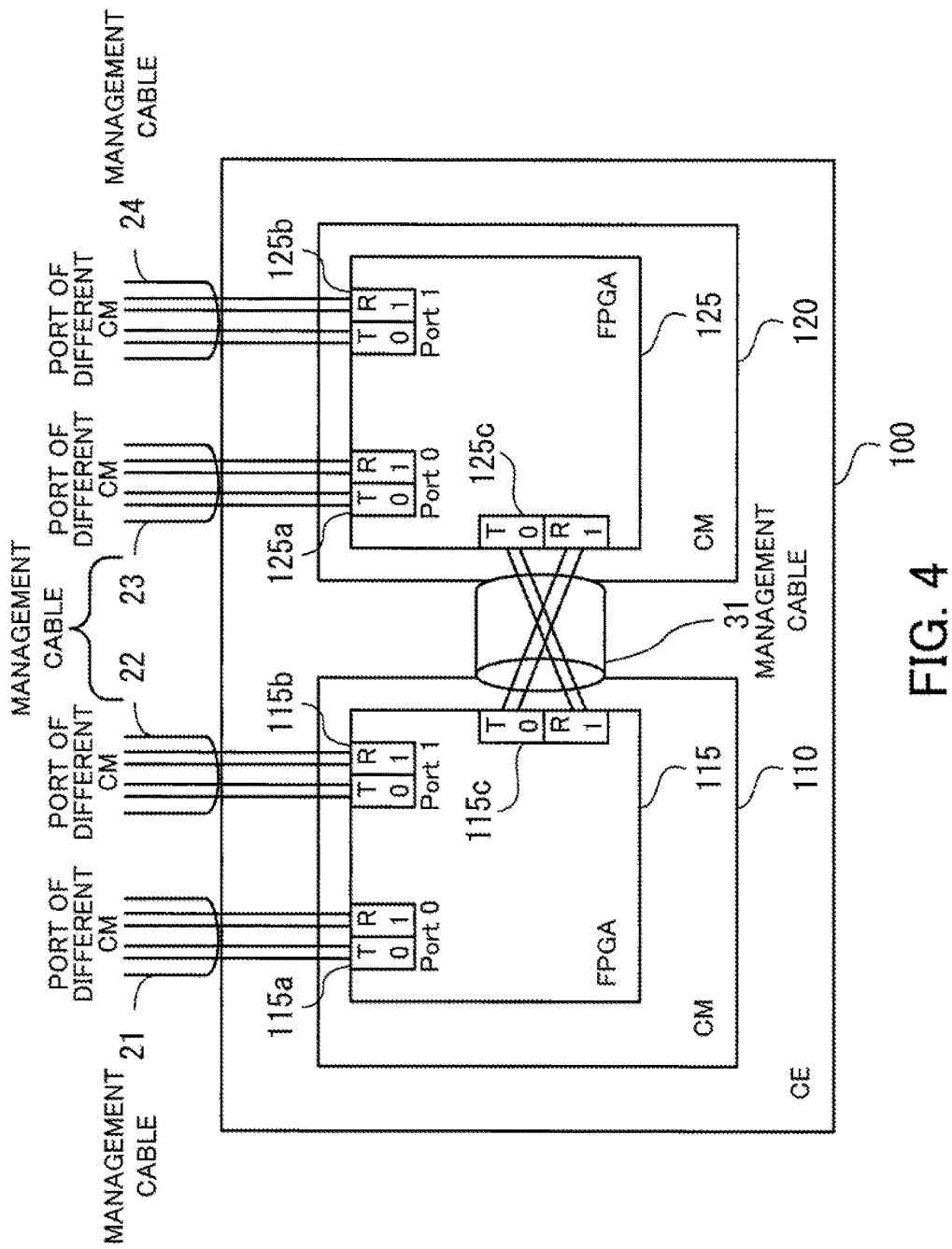
FIG. 4 illustrates an example of communication ports in an individual field programmable gate array (FPGA)

FIG. 4 illustrates an example of communication ports in the FPGAs 115 and 125. The FPGA 115 includes two management ports 115*a* and 115*b* and one internal communication port 115*c*. Each of the management ports 115*a* and 115*b* is provided with a port number. The port number of the management port 115*a* is "0," and the port number of the management port 115*b* is "1."

The FPGA 125 includes two management ports 125*a* and 125*b* and one internal communication port 125*c*. The port number of the management port 125*a* is "0," and the port number of the management port 125*b* is "1."

The management ports 115*a* and 115*b* in the FPGA 115 are connected to management ports of the FPGA in the CM 420 in the CE 400 different from the CE 100 via management cables 21 and 22, respectively. The management ports 125*a* and 125*b* in the FPGA 125 are connected to management ports of the FPGA in the CM 210 in the CE 200 different from the CE 100 via management cables 23 and 24, respectively. The internal communication port 115*c* of the FPGA 115 in the CM 110 is connected to the internal communication port 125c of the FPGA 125 in the CM 120 via a management cable 31.

An individual management cable includes four signal lines. Two of the signal lines are used for data transmission, and the other two signal lines are used for data reception. In FIG. 4, an individual communication port has transmission signal line connection portions denoted represented by "T." In addition, an individual communication port has reception signal line connection portions denoted by "R." Each of the transmission signal line connection portions is assigned "0" as its ID. In addition, each of the reception signal line connection portions is assigned "1" as its ID.

For example, an individual FPGA performs communication between CMs by using a synchronous serial transmission method.

FIG. 5 illustrates an example of signals used in communication between CMs. Clock signals that are transmitted are denoted by "TXCLK." The communication direction of these clock signal is denoted by "Out." Data signals that are transmitted are denoted by "TXDATA." The communication direction of these data signals is denoted by "Out." Clock signals that are received are denoted by "RXCLK." The communication direction of these clock signals is denoted by "In." Data signals that are received are denoted by "RXDATA." The communication direction of these data signals is denoted by "In."

Thus, an individual management cable is formed by a pair of data lines and a pair of clock lines. An individual FPGA performs management communication on the basis of synchronous serial transmission using clock signals via its management cables. For example, the clock frequency is 100 MHz.

In the second embodiment, the management cables are connected in such a manner that the following conditions are satisfied.

1) There is only one management cable that connects a management port whose port number is "0" in a CM whose CM number is "0" and a management port whose port number is "1" in a CM whose CM number is "1," this latter CM being included in a CE different from the CE including the former CM.

2) There is only one management cable that connects a management port whose port number is "0" in a CM whose CM number is "1" and a management port whose port number is "1" in a CM whose CM number is "0," this latter CM being included in a CE different from the CE including the former CM.

3) Other than the above cases 1) and 2), there may be at least one management cable that connects a management port whose port number is "0" in a CM whose CM number is "0" and a management port whose port number is "0" in a CM whose CM number is "1," the latter CM being included in a CE different from the CE including the former CM.

4) Other than the above cases 1) and 2), there may be at least one management cable that connects a management port whose port number is "1" in a CM whose CM number is "1" and a management port whose port number is "1" in a CM whose CM number is "0," the latter CM being included in a CE different from the CE including the former CM.

In this way, by connecting CMs to each other with management cables in such a manner that the above four conditions are satisfied, a single CM serving as the master that manages the entire storage system is determined on the basis of the connection mode of the management cables.

Figure 6:
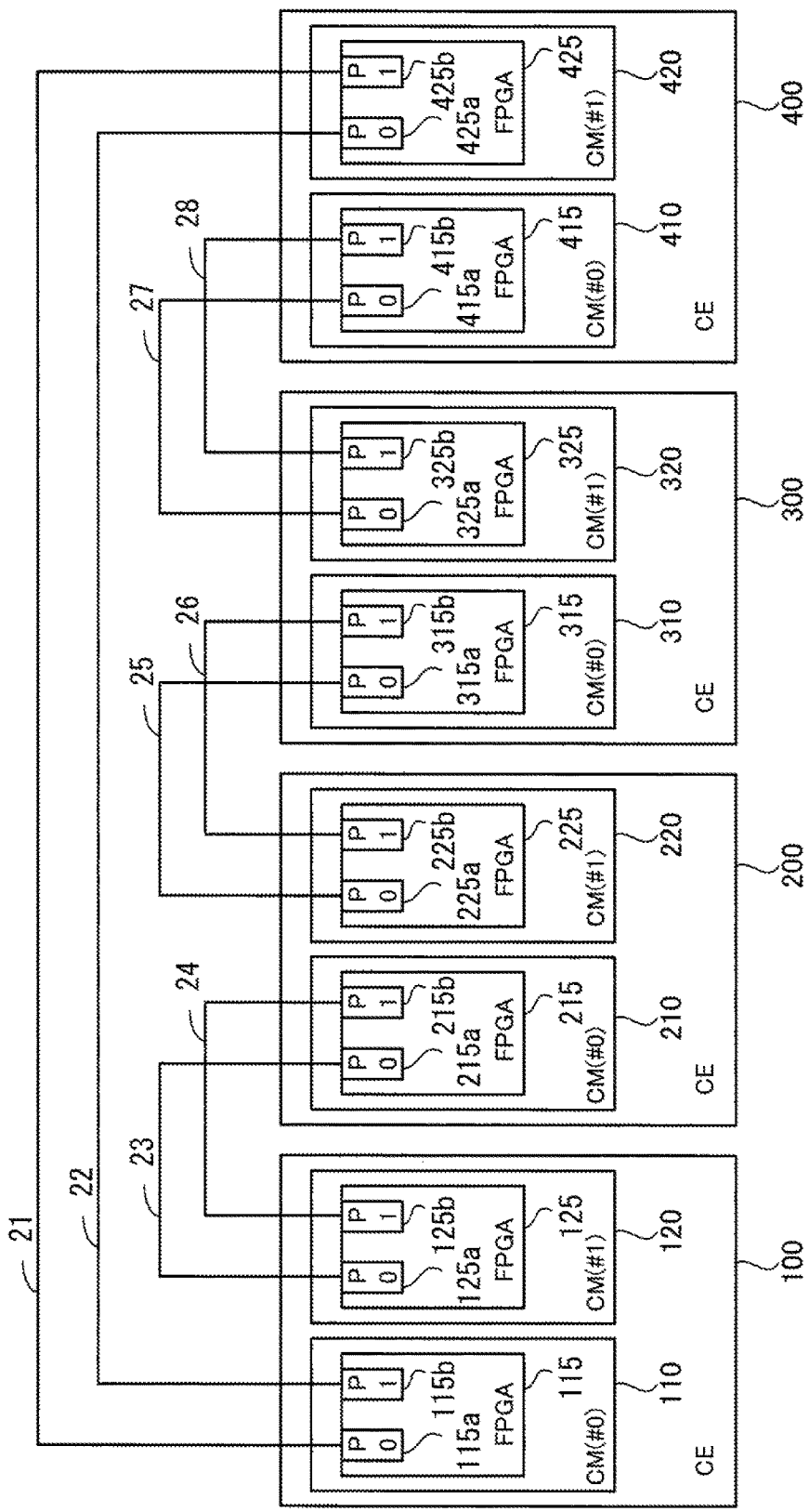
FIG. 6 illustrates a connection mode among CMs.

FIG. 6 illustrates a connection mode among CMs. As is the case with the CE 100, the other CMs 210, 220, 310, 320, 410, and 420 in the other CEs 200, 300, and 400 include FPGAs 215, 225, 315, 325, 415, and 425, respectively. As is the case with the FPGAs 115 and 125, the FPGAs 215, 225, 315, 325, 415, and 425 include management ports 215a, 215b, 225a, 225b, 315a, 315b, 325a, 325b, 415a, 415b, 425a, and 425b. The port number of the management ports 215a, 225a, 315a, 325a, 415a, and 425a is "0," and the port number of the management port 215b, 225b, 315b, 325b, 415b, and 425b is "1."

The FPGA 115 in the CM 110 in the CE 100 is connected to the FPGA 425 in the CM 420 in the CE 400 via the management cables 21 and 22. The management cable 21 connects the management port 115a whose port number is "0" in the FPGA 115 and the management port 425b whose port number is "1" in the FPGA 425. The management cable 22 connects the management port 115b whose port number is "1" in the FPGA 115 and the management port 425a whose port number is "0" in the FPGA 425.

The FPGA 125 in the CM 120 in the CE 100 is connected to the FPGA 215 in the CM 210 in the CE 200 via the management cables 23 and 24. The management cable 23 connects the management ports 125a and 215a whose port number is "0" in the two FPGAs 125 and 215. The management cable 24 connects the management ports 125b and 215b whose port number is "1" in the two FPGAs 125 and 215.

The FPGA 225 in the CM 220 in the CE 200 is connected to the FPGA 315 in the CM 310 in the CE 300 via management cables 25 and 26. The management cable 25 connects the management ports 225a and 315a whose port number is "0" in the two FPGAs 225 and 315. The management cable 26 connects the management ports 225b and 315b whose port number is "1" in the two FPGAs 225 and 315.

The FPGA 325 in the CM 320 in the CE 300 is connected to the FPGA 415 in the CM 410 in the CE 400 via management cables 27 and 28. The management cable 27 connects the management ports 325a and 415a whose port number is "0" in the two FPGAs 325 and 415. The management cable 28 connects the management ports 325b and 415b whose port number is "1" in the two FPGAs 325 and 415.

In this way, each of the management cables 23 to 28 connects two management ports having the same port number. In contrast, each of the management cables 21 and 22 connects two management ports having different port numbers.

On the basis of the connection relationship of the management cables illustrated in FIG. 6, an individual CM serving as a master is determined. In the second embodiment, there are four master levels of "master 1" to "master 4." In this case, four CMs serve as master-1 to master-4 CMs, respectively. The master-1 CM manages all the CMs 110, 120, 210, 220, 310, 320, 410, and 420 in the storage system. The master-2 CM monitors the master-1 CM and switches to serve as the master-1 CM when detecting that the master-1 CM has malfunctioned. The master-3 CM monitors the master-1 CM and switches to serve as the master-2 CM when detecting that the master-1 CM has malfunctioned. The master-4 CM monitors the master-2 CM and switches to serve as the master-2 CM when detecting that the master-2 CM has malfunctioned.

In the example in FIG. 6, the plurality of CMs 110, 120, 210, 220, 310, 320, 410, and 420 are connected to each other by using a ring-type daisy chain. Hereinafter, the serial connection relationship of the management cables 23 to 28 each connecting management ports having the same port number and the internal connections in the CEs 100, 200, 300, and 400 will be considered (the connections of the management cables 21 and 22 will not be considered). The master-1 CM 110 and the master-2 CM 420 are the outermost CMs. The master-3 CM 120 is arranged next to the master-1 CM 110 in the serial connection relationship. In addition, the master-4 CM 410 is arranged next to the master-2 CM in the serial connection relationship. By arranging the CMs in this way, when any of the outer master-1 CM 110 and master-2 420 malfunctions, the corresponding one of the inner CMs 120 and 410 connected to the outer CMs 110 and 420 in the respective CEs easily serves as the master-1 or master-2 CM through failover processing. In this way, the redundancy is enhanced.

Each of the FPGAs 115, 125, 215, 225, 315, 325, 415, and 425 exchanges control packets with its peer CM connected to a corresponding one of the management cables 21 to 28, so as to determine whether to serve as the master-1 CM or the master-2 CM.

For example, FPGAs connected to each other exchange control packets including CM numbers and port numbers of the connected management ports. For example, if a CM determines that a predetermined condition is satisfied, the CM serves as the master-1 CM or the master-2 CM. The predetermined condition is about a combination of a CM number and a port number included in a received control packet and a combination of the CM number of the CM that has received the control packet and the port number of the reception management port.

For example, the master-3 CM is a different CM in the CE in which the master-1 CM is arranged. For example, the master-4 CM is a different CM in the CE in which the master-2 CM is arranged.

As described above, in the second embodiment, the masters are determined on the basis of the relationship of the connections established by using the management cables 21 to 28.

The CMs serving as the masters are determined autonomously by the FPGAs 115, 125, 215, 225, 315, 325, 415, and 425. The master-1 CM manages the other CMs. When one CM receives a DC-ON instruction, the FPGAs 115, 125, 215, 225, 315, 325, 415, and 425 coordinate with each other and start to supply DC power to the respective CMs.

Figure 7:
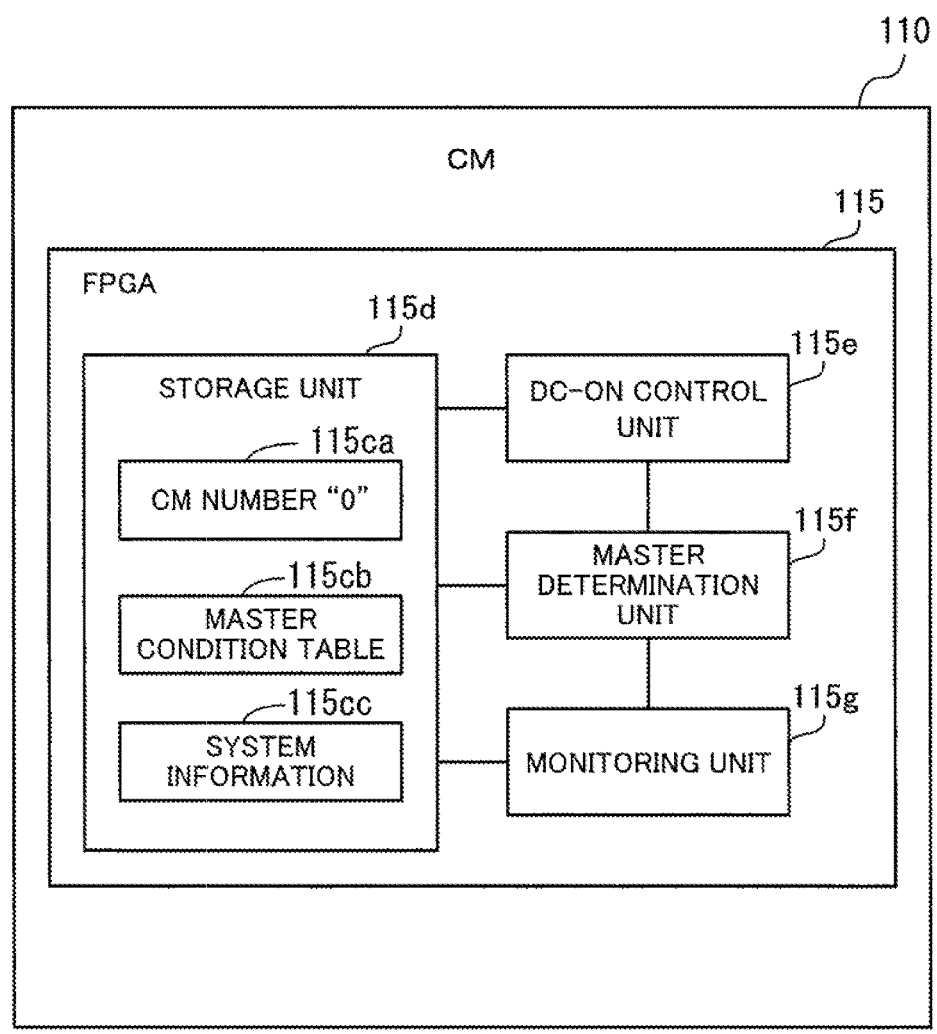
FIG. 7 is a block diagram illustrating an example of functions of an FPGA.

FIG. 7 is a block diagram illustrating an example of functions of the FPGA 115. The FPGA 115 includes a storage unit 115$d$, a DC-ON control unit 115$e$, a master determination unit 115$f$, and a monitoring unit 115$g$.

The storage unit 115$d$ holds a CM number 115$ca$ of the CM 110 including the FPGA 115, a master condition table 115$cb$, and system information 115$cc$, for example. The master condition table 115$cb$ is a data table in which conditions allowing the CM 110 to serve as the master-1 CM and the master-2 CM, respectively, are defined. The system information 115$cc$ is management information collected from all the CMs 110, 120, 210, 220, 310, 320, 410, and 420 in the storage system. The system information 115$cc$ is stored in the storage unit 115$d$ when the CM 110 serves as a master. The storage unit 115$d$ is realized by a memory such as a RAM in the FPGA 115, for example.

The DC-ON control unit 115$e$ controls the DC power supplied to the CM 110. For example, when a DC-ON instruction is externally inputted, the DC-ON control unit 115$e$ starts to supply DC power to the CM 110 and transmits a control packet instructing DC-ON to an FPGA in a different CM. In addition, when receiving a control packet instructing DC-ON from an FPGA in a different CM, the DC-ON control unit 115$e$ starts to supply DC power to the CM 110. In addition, the DC-ON control unit 115$e$ transmits a control packet instructing DC-ON to an FPGA in a CM different from the CM in which the transmission source FPGA is included.

After the DC power is supplied to the CM 110, 120, 210, 220, 310, 320, 410, and 420, the master determination unit 115$f$ determines whether the CM 110 needs to serve as a master. For example, the master determination unit 115$f$ transmits a CM/port/direction (CPD) packet, which is a kind of control packet, to a different CM connected via a management cable from the management port whose port number is "0." The CPD packet includes information (CPD) about the CM number of the source CM, the port number of the transmitting management port, and the communication direction. In addition, the master determination unit 115$f$ receives a CPD packet from the different CM connected via the management cable via the management port whose port number is "0." The master determination unit 115$f$ determines whether the CM 110 needs to serve as the master-1 CM or the master-2 CM on the basis of the contents of a received CPD packet. When the CM 110 needs to serve as the master-1 CM, the master determination unit 115$f$ instructs the CM 120 in the same CE 100 to serve as the master-2 CM. When the CM 110 needs to serve as the master-2 CM, the master determination unit 115$f$ instructs the CM 120 in the same CE 100 to serve as the master-4 CM. In addition, when the CM 120 in the same CE 100 instructs the CM 110 to serve as the master-3 CM or the master-4 CM, the master determination unit 115$f$ determines that the CM 110 needs to serve as the master as instructed.

When the master determination unit 115$f$ determines that the CM 110 serves as a master, depending on the master level, the monitoring unit 115$g$ monitors whether the corresponding CM is properly operating. For example, when the master determination unit 115$f$ determines that the CM 110 serves as the master-1 CM, the monitoring unit 115$g$ monitors the operation of the master-2 CM. If the monitoring unit 115$g$ detects that the master-2 CM has malfunctioned, the monitoring unit 115$g$ performs failover processing and causes a different CM to change its master level to "master 2." When the master determination unit 115$f$ determines that the CM 110 serves as the master-2 CM, the monitoring unit 115$g$ monitors the operation of the master-1 CM. If the monitoring unit 115$g$ detects that the master-1 CM has malfunctioned, the monitoring unit 115$g$ performs failover processing and changes the master level of the CM 110 to "master 1." When the master determination unit 115$f$ determines that the CM 110 serves as the master-3 CM, the monitoring unit 115$g$ monitors the operation of the master-1 CM. If the monitoring unit 115$g$ detects that the master-1 CM has malfunctioned, the monitoring unit 115$g$ performs failover processing and changes the master level of the CM 110 to "master 2." When the master determination unit 115$f$ determines that the CM 110 serves as the master-4 CM, the monitoring unit 115$g$ monitors the operation of the master-2 CM. If the monitoring unit 115$g$ detects that the master-2 CM has malfunctioned, the monitoring unit 115$g$ performs failover processing and changes the master level of the CM 110 to "master 2."

Each of the other FPGAs 125, 215, 225, 315, 325, 415, and 425 also includes the same functions as those of the FPGA 115. In this way, the CMs 110, 120, 210, 220, 310, 320, 410, and 420 are managed without using SVCs.

When the CM 110 serves as the master-1 CM, the CM 110 manages all the CMs 110, 120, 210, 220, 310, 320, 410, and 420. Whether the CM 110 serves as the master-1 CM or the master-2 CM is defined in the master condition table 115*cb*.

Figure 8:
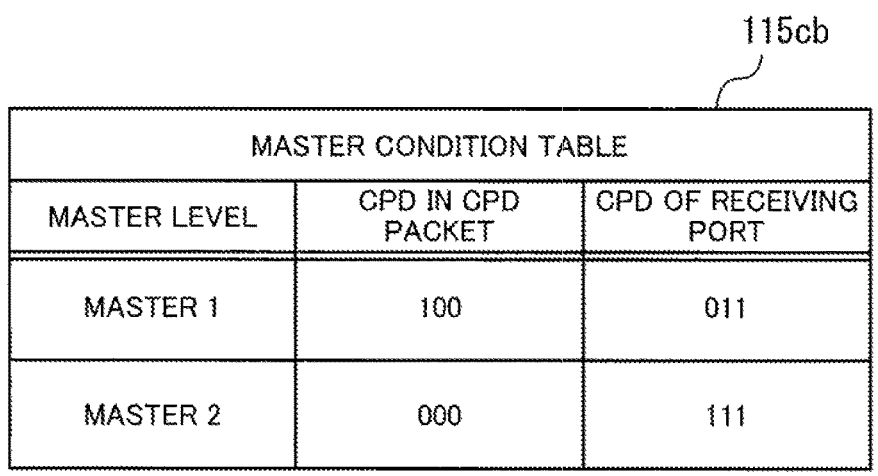
FIG. 8 illustrates an example of a master condition table.

FIG. 8 illustrates an example of the master condition table 115*cb*. The master condition table 115*cb* includes columns for "master level," "CPD in CPD packet," and "CPD of receiving port." In an individual box under "master level," a master level to be determined is set. In an individual box under "CPD in CPD packet," CPD values included in a received CPD packet are set. If the CM 110 receives a CPD packet indicating these CPD values, the CM 110 could serve as the corresponding master. In an individual box under "CPD of receiving port," CPD values of a management port that has received a CPD packet are set. When the CM 110 receives a CPD packet via a management port, if the CPD values of the receiving port indicates these CPD values, the CM 110 could serve as the corresponding master. An individual set of CPD values indicates, from the left to right, a CM number, a port number, and a communication direction (transmission: 0 and reception: 1).

The CPD value indicating the communication direction in a CPD packet received from a different CM is always "0." In addition, the CPD value indicating the communication direction of a management port that receives a CPD packet is always "1." In the example in FIG. 8, when a management port whose port number is "1" of a CM whose CM number is "0" receives a CPD packet outputted from a management port whose port number is "0" of a CM whose CM number is "1," the receiving CM serves as the master-1 CM. In addition, when a management port whose port number is "1" of a CM whose CM number is "1" receives a CPD packet outputted from a management port whose port number is "0" of a CM whose CM number is "0," the receiving CM serves as the master-2 CM.

Figure 9:
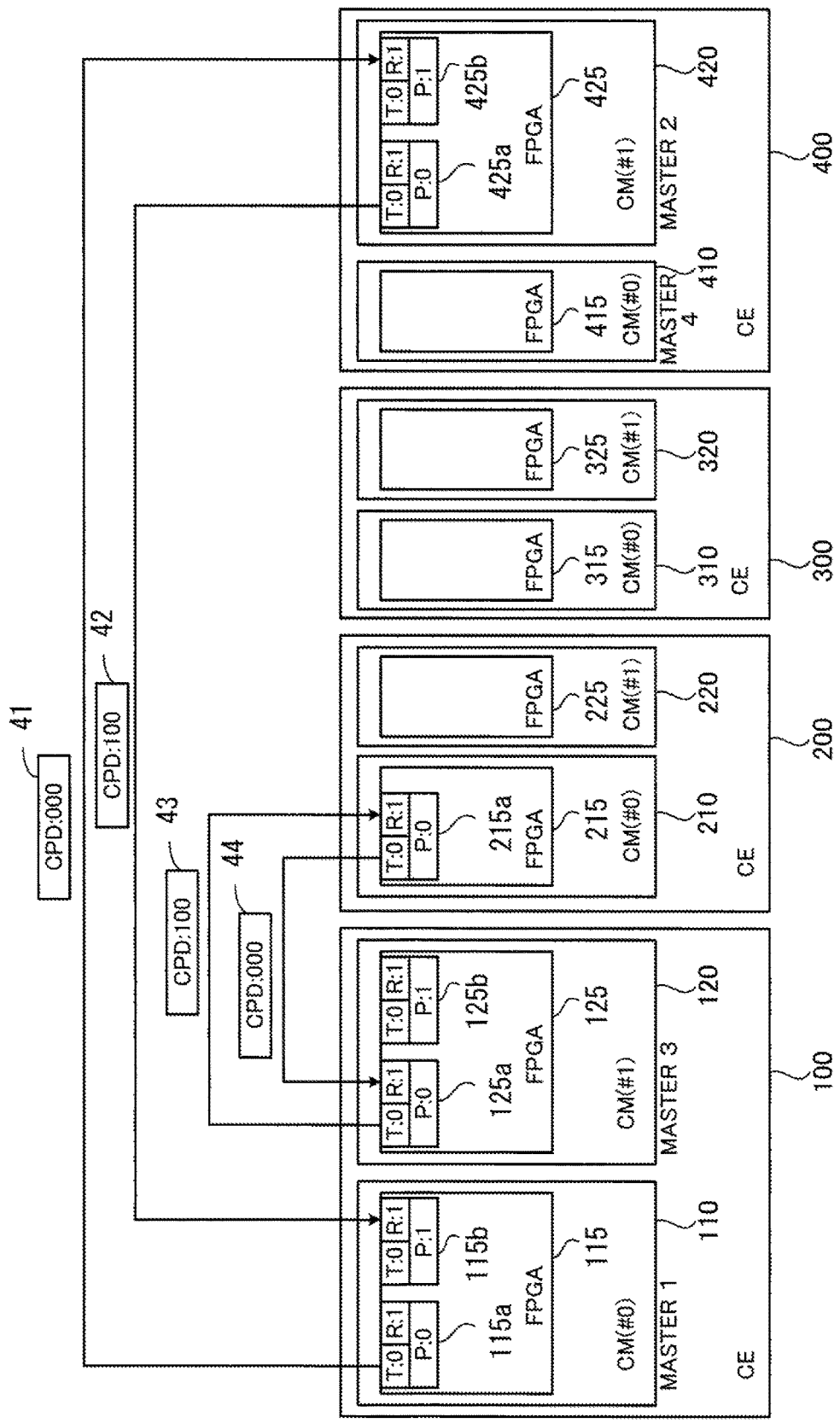
FIG. 9 illustrates an example of how masters are determined.

FIG. 9 illustrates an example of how masters are determined. For example, when AC power is supplied to the entire storage system, each of the FPGAs 115, 125, 215, 225, 315, 325, 415, and 425 transmits a CPD packet from its management ports. According to the master condition table 115*cb* illustrated as an example in FIG. 8, if a CM receives a CPD packet outputted from a management port whose port number is "0," the CM could be allowed to serve as the master-1 CM or the master-2 CM. Thus, when the master condition table 115*cb* illustrated in FIG. 8 is used, only the management ports whose port number is "0" may transmit a CPD packet.

For example, the CPD values included in a CPD packet 41 transmitted from the management port 115*a* whose port number is "0" of the FPGA 115 are "000." This CPD packet 41 is received by the management port 425*b* whose port number is "1" of the FPGA 425. The CPD values of the management port 425*b* as the corresponding receiving port are "111." In this case, the CPD values match the conditions corresponding to the master-2 CM in the master condition table 115*cb*. Thus, the FPGA 425 determines that the CM 420 serves as the master-2 CM.

A CPD packet 43 including the same CPD values as those in the CPD packet 41 is transmitted from the management port 125*a* whose port number is "0" of the FPGA 125. This CPD packet 43 is received by the management port 215*a* whose port number is "0" of the FPGA 215. The CPD values of the management port 215*a* as the corresponding receiving port are "001." In this case, the CPD values do not match any conditions in the master condition table 115*cb*. Thus, the FPGA 215 determines that the CM 210 will not serve as the master-1 CM or the master-2 CM.

The CPD values included in a CPD packet 42 transmitted from the management port 425*a* whose port number is "0" of the FPGA 425 are "100." This CPD packet 42 is received by the management port 115*b* whose port number is "1" of the FPGA 115. The CPD values of the management port 115*b* as the corresponding receiving port are "011." In this case, the CPD values match the conditions corresponding to the master-1 CM in the master condition table 115*cb*. Thus, the FPGA 115 determines that the CM 110 serves as the master-1 CM.

In addition, a CPD packet 44 including the same CPD values as those in the CPD packet 41 is transmitted from the management port 215*a* whose port number is "0" of the FPGA 215. This CPD packet 44 is received by the management port 125*a* whose port number is "0" of the FPGA 125. The CPD values of the management port 125*a* as the corresponding receiving port are "101." In this case, the CPD values do not match any conditions in the master condition table 115*cb*. Thus, the FPGA 125 determines that the CM 120 will not serve as the master-1 CM or the master-2 CM.

The FPGA 115 that has determined that the CM 110 serves as the master-1 CM instructs the FPGA 125 included in the same CE 100 to serve as the master-3 CM. In accordance with this instruction, the FPGA 125 determines that the CM 120 serves as the master-3 CM.

The FPGA 425 that has determined that the CM 420 serves as the master-2 CM instructs the FPGA 415 included in the CE 400 to serve as the master-4 CM. In accordance with this instruction, the FPGA 415 determines that the CM 410 serves as the master-4 CM.

In this way, the CMs that operate as the master-1 CM to the master-4 CM, respectively, are determined. This master determination processing is performed within a very short time. For example, the masters are determined within one second after the AC power is supplied.

Control packets such as the CPD packets 41 to 44 are packets used for exchange of control information among the FPGAs 115, 125, 215, 225, 315, 325, 415, and 425. When a CM receives a control packet from a CM included in a different CE, if the receiving CM is not the destination (target CM), the receiving CM transfers the control packet to the other CM included in the same CE through inter-CE communication.

If the CM that has received the control packet through inter-CE communication is not the destination, the receiving CM transfers the control packet to a CM included in a different CE. In this operation, if the port number of the management port of the CM that has received the control packet from the different CE is "0," the CM that has received the control packet through inter-CE communication transmits the control packet from the management port whose port number is "1." If the port number of the management port of the CM that has received the control packet from the different CE is "1," the CM that has received the control packet through inter-CE communication transmits the control packet from the management port whose port number is "0." Namely, when a control packet is received by a management port in a CE, the control packet is transmitted from a management port whose port number is different from that of the receiving management port.

Figure 10:
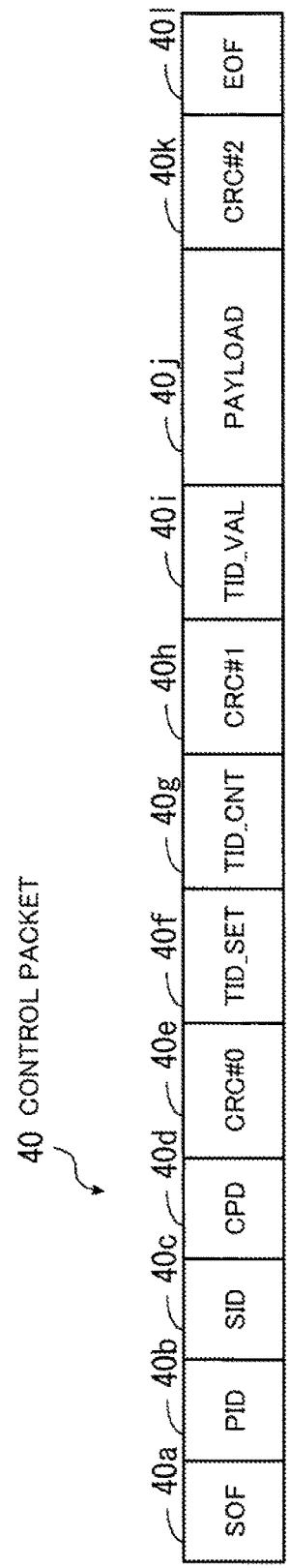
FIG. 10 illustrates an example of a format of a control packet.

FIG. 10 illustrates an example of a format of a control packet 40. The control packet 40 includes 12 fields 40*a* to 40*l*.

The size of the field 40*a* is 4 bits. In the field 40*a*, a start-of-frame (SOF) header is held. The SOF header indicates a predetermined value representing the start of the packet. For example, the value of the SOF header is "1111 (a binary number)."

The size of the field 40b is 1 byte. In the field 40b, a processor ID (PID) is held. The PID is an identifier that uniquely identifies a CM in the storage system. For example, any one of the values from "255 (a decimal number)" to "0000 (a decimal number)" is set as the PID.

The size of the field 40c is 1 byte. In the field 40c, a sequence ID (SID) is held. The SID is a number allocated to a packet by a CM that transmits the control packet. For example, any one of the values from "255 (a decimal number)" to "0000 (a decimal number)" is set as the SID on the basis of a memory address or a command type.

The size of the field 40d is 1 byte. In the field 40d, CPD values are set.

The size of the field 40e is 1 byte. In the field 40e, a cyclic redundancy check (CRC) code (CRC#0) of the CPD values is held for data protection. For example, the CRC code is a value calculated by using a polynomial referred to as CRC-8-ATM (asynchronous transfer mode).

The size of the field 40f is 1 byte. In the field 40f, a transfer stage number set value (TID_SET) is held. The transfer stage number set value is a value that specifies the number of transfer stages from a source CM to a destination CM. For example, when the CM 110 transfers a control packet to the CM 420 to which the CM 110 is directly connected via the management cable 21, the stage number is "1." When the CM 110 transfers a control packet to the CM 410 that is included in the same CE with the CM 420 via the CM 420, the stage number is "2."

The size of the field 40g is 1 byte. In the field 40g, a transfer control set value (TID_CNT) between CMs is held. The TID_CNT is information specifying whether a CM performs transfer while adding or subtracting a transfer current value (addition transfer) or (subtraction transfer) or information determining a target CM (a destination CM). As the information determining a target CM, a number (master CM number) that specifies the master level of a CM serving as a master may be used, for example.

The size of the field 40h is 1 byte. In the field 40h, a CRC code (CRC#1) of the transfer stage number set value (TID_SET) is held for data protection. The CRC code is a value calculated by using CRC-8-ATM, for example.

The size of the field 40i is 1 byte. In the field 40i, a transfer current value (TID_VAL) is held. In the case of the addition transfer, the initial value of the transfer current value is "00" (a hexadecimal number) and is incremented by 1 each time transfer between CMs is performed. In the case of the subtraction transfer, the initial value of the transfer current value is the transfer stage number set value and is decremented by 1 each time transfer between CMs is performed.

The size of the field 40j is 4 bytes. The field 40j represents payload. In the field 40j, a message or control data is held.

The size of the field 40k is 1 byte. In the field 40k, a CRC code (CRC#2) of the PID values is held for data protection. The CRC code is a value calculated by using CRC-8-ATM, for example.

The size of the field 40l is 4 bits. In the field 40l, an end-of-frame (EOF) header is held. The EOF header indicates a predetermined value representing the end of the packet. For example, the value of the EOF header is "0000 (a binary number)."

By using the control packet 40 in the format as described above, control communication is performed between CMs serving as masters. FIGS. 11 and 12 illustrate examples of main data in control packets transmitted by the master-1 CM to the master-4 CM. FIG. 11 illustrates examples of data in control packets transmitted by the master-1 CM and the master-2 CM. FIG. 12 illustrates examples of data in control packets transmitted by the master-3 CM and the master-4 CM.

As illustrated in FIGS. 11 and 12, the PID values in a control packet transmitted by the master-1 CM is "0x01." The PID values in a control packet transmitted by the master-2 CM is "0x02." The PID values in a control packet transmitted by the master-3 CM is "0x03." The PID values in a control packet transmitted by the master-4 CM is "0x04."

Examples of the SID include data, master notification communication, and WatchDog communication. This "WatchDog communication" is communication of a signal indicating a normal operation. A master CM regularly transmits a signal to a different CM through WatchDog communication. In this way, the CM is able to determine whether the different CM is normally operating.

In this way, when receiving a CPD packet, an individual one of the FPGAs 115, 125, 215, 225, 315, 325, 415, and 425 checks the CPD values in the CPD packet against the CPD values of the management port that has received the CPD packet and determines whether the corresponding CM needs to serve as a master.

While the four CEs 100, 200, 300, and 400 are illustrated in the example in FIG. 2, only the two CEs 100 and 200 may be used when the operation of the storage system is started. If the load is increased thereafter, scale out may be performed. Even when only two CEs are used, the same management cable connection method and the same master determination method as those used when four CEs are used can be used.

Figure 13:
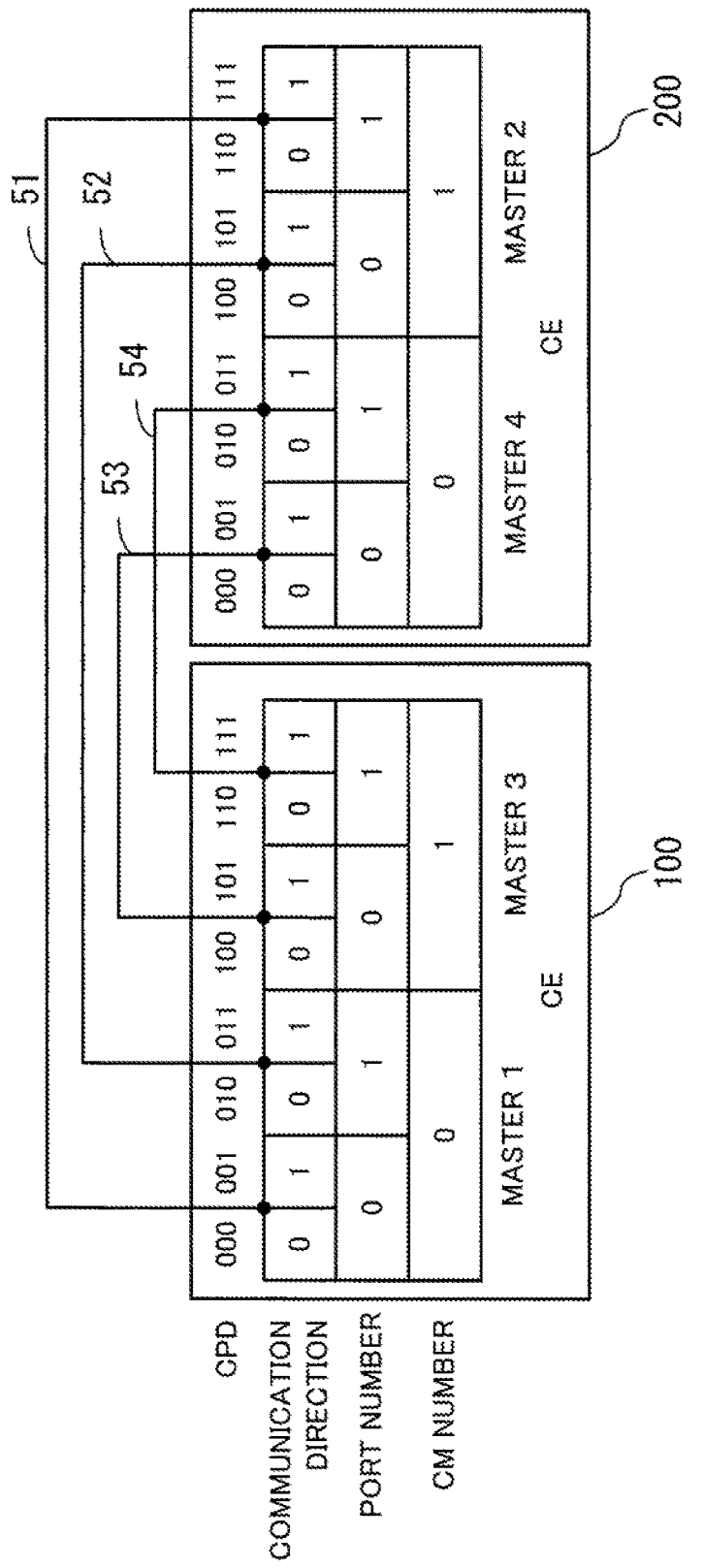
FIG. 13 illustrates a connection example of two CEs.

FIG. 13 illustrates a connection example of two CEs. In the example in FIG. 13, the management port whose port number is "0" of the CM whose CM number is "0" in the CE 100 is connected to the management port whose port number is "1" of the CM whose CM number is "1" in the CE 200 via a management cable 51. In addition, the management port whose port number is "1" of the CM whose CM number is "0" in the CE 100 is connected to the management port whose port number is "0" of the CM whose CM number is "1" in the CE 200 via a management cable 52. In addition, the management port whose port number is "0" of the CM whose CM number is "1" in the CE 100 is connected to the management port whose port number is "0" of the CM whose CM number is "0" in the CE 200 via a management cable 53. In addition, the management port whose port number is "1" of the CM whose CM number is "1" in the CE 100 is connected to the management port whose port number is "1" of the CM whose CM number is "0" in the CE 200 via a management cable 54.

When the management ports are connected in this way, the CM whose CM number is "0" in the CE 100 serves as the master-1 CM, and the CM whose CM number is "1" in the CE 200 serves as the master-2 CM. In addition, the CM whose CM number is "1" in the CE 100 serves as the master-3 CM, and the CM whose CM number is "0" in the CE 200 serves as the master-4 CM.

Next, how an individual CM 110, 120, 210, and 220 performs a procedure of DC-ON processing when connected as illustrated in FIG. 13 will be described.

Figure 14:
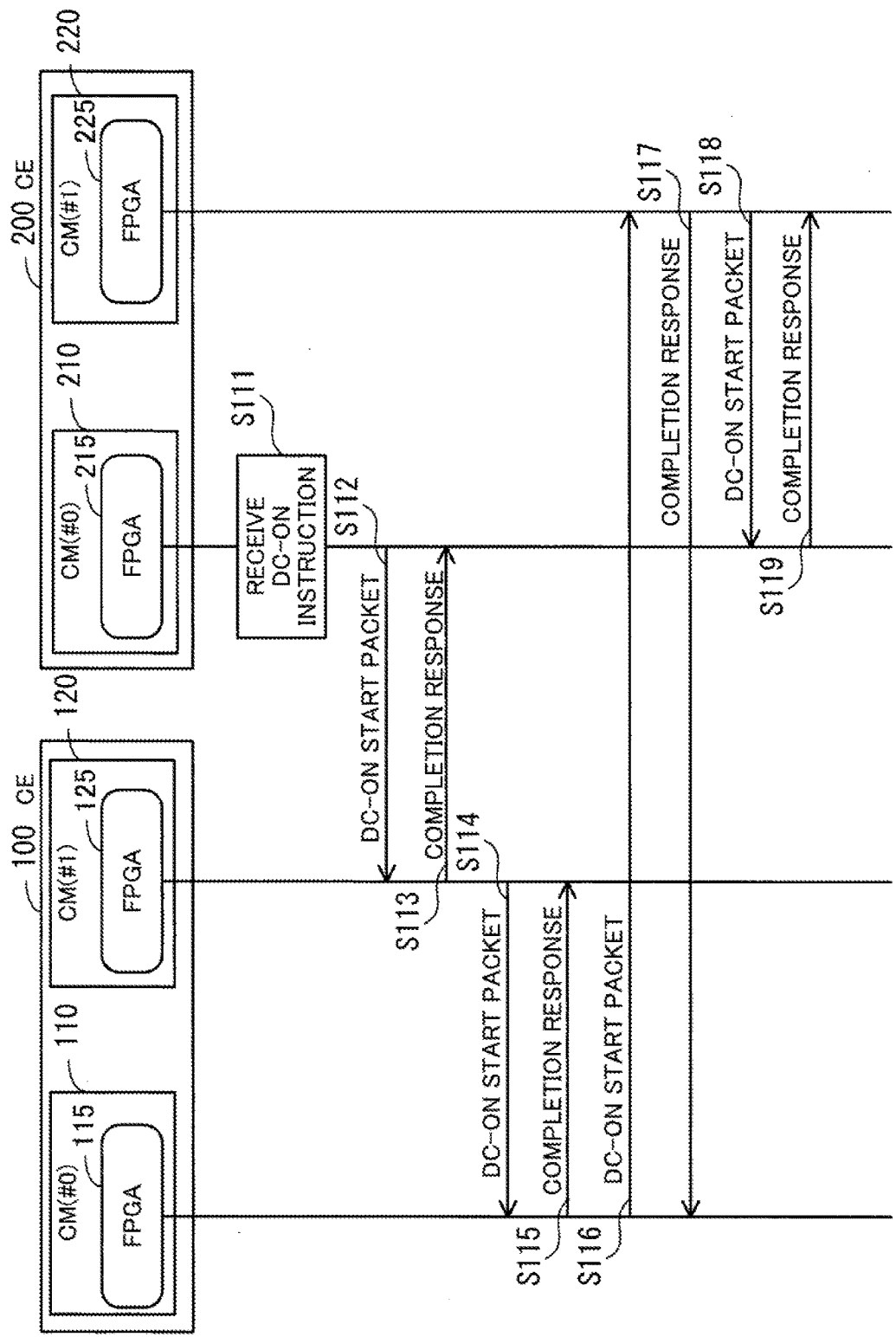
FIG. 14 is a first sequence diagram illustrating a procedure of DC-ON processing.

FIG. 14 is a first sequence diagram illustrating a procedure of DC-ON processing. The example in FIG. 14 assumes that an operation of instructing DC-ON has been performed on the CE 200. In this operation, the FPGA 215 in the CM 210 whose CM number is "0" in the CE 200 receives the DC-ON instruction (step S111). The FPGA 215 transmits a DC-ON start packet from its management port whose port number is "0" (step S112). The FPGA 125 in the CM 120 receives this DC-ON start packet from the FPGA 215.

When receiving the DC-ON start packet, the FPGA 125 transmits a completion response to the CM 210 (step S113). In addition, the FPGA 125 transmits a DC-ON start packet to the CM 110 of a different channel in the same CE 100 through inter-CE communication (step S114).

When receiving the DC-ON start packet, the FPGA 115 in the CM 110 transmits a completion response to the CM 120 (step S115). In addition, the FPGA 115 transmits a DC-ON start packet from its management port whose port number is "1" (step S116). The FPGA 225 in the CM 220 receives this DC-ON start packet from the FPGA 115.

When receiving the DC-ON start packet, the FPGA 225 transmits a completion response to the CM 110 (step S117). In addition, the FPGA 225 transmits a DC-ON start packet to the CM 210 of a different channel in the same CE 200 through inter-CE communication (step S118).

When receiving the DC-ON start packet, the FPGA 215 in the CM 210 transmits a completion response to the CM 220 (step S119). When receiving the DC-ON start packet, the FPGA 215 determines that a DC-ON instruction has been given to all the constituent CMs.

Figure 15:
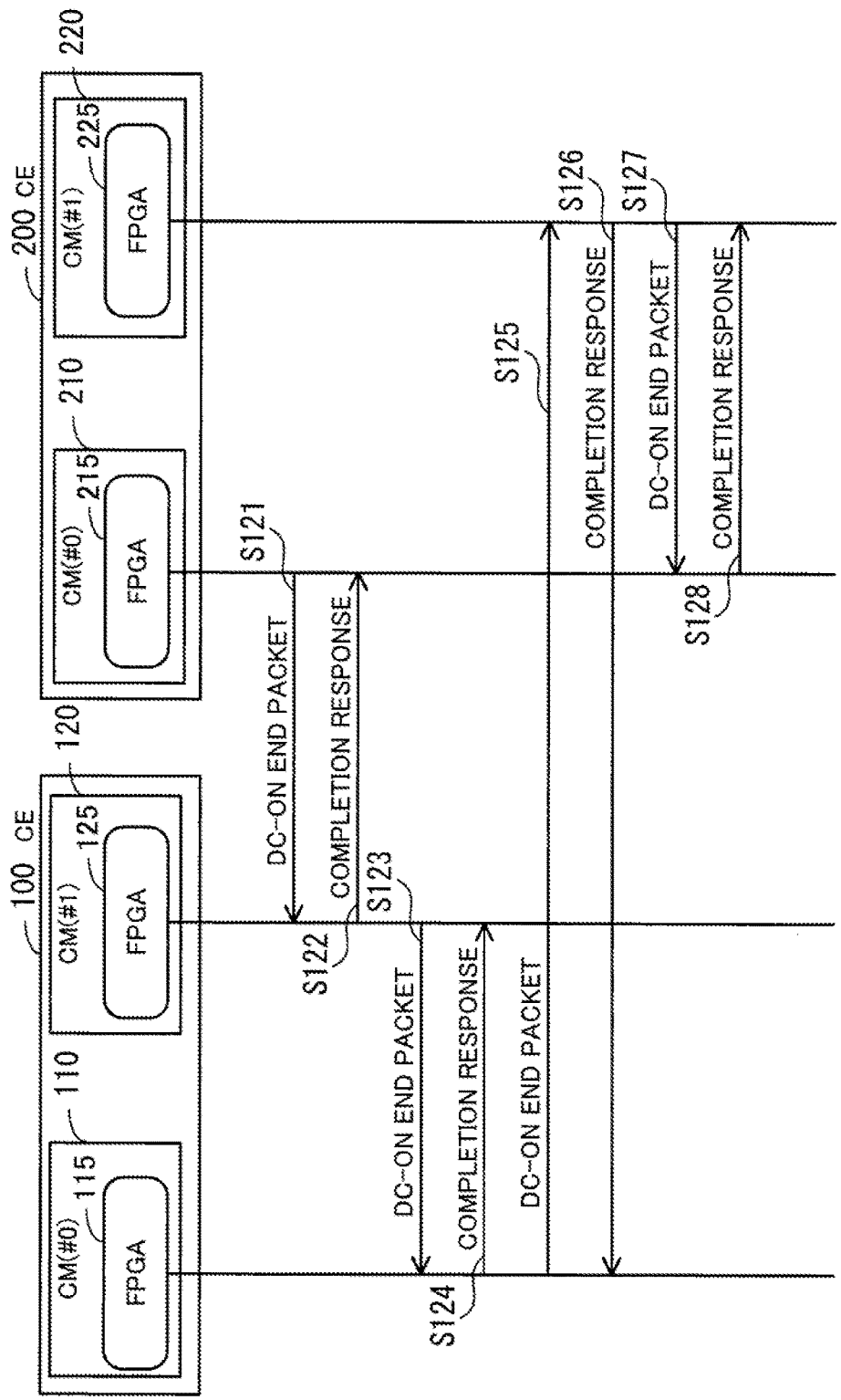
FIG. 15 is a second sequence diagram illustrating the procedure of DC-ON processing.

FIG. 15 is a second sequence diagram illustrating the procedure of the DC-ON processing. When determining that a DC-ON instruction has been given to all the CMs, the FPGA 215 transmits a DC-ON end packet from its management port whose port number is "0" (step S121). The FPGA 125 in the CM 120 receives this DC-ON end packet from the FPGA 215.

When receiving the DC-ON end packet, the FPGA 125 transmits a completion response to the CM 210 (step S122). In addition, the FPGA 125 transmits a DC-ON end packet to the CM 110 of a different channel in the same CE 100 through inter-CE communication (step S123).

When receiving the DC-ON end packet, the FPGA 115 in the CM 110 transmits a completion response to the CM 120 (step S124). In addition, the FPGA 115 transmits a DC-ON end packet from its management port whose port number "1" (step S125). The FPGA 225 in the CM 220 receives this DC-ON end packet from the FPGA 115.

When receiving the DC-ON end packet, the FPGA 225 transmits a completion response to the CM 110 (step S126). In addition, the FPGA 225 transmits a DC-ON end packet to the CM 210 of a different channel in the same CE 200 through inter-CE communication (step S127).

When receiving the DC-ON end packet, the FPGA 215 in the CM 210 transmits a completion response to the CM 220 (step S128).

In this way, the DC-ON processing on the CMs 110, 120, 210, and 220 is completed. After the completion of the DC-ON processing, master determination processing is started. Hereinafter, a procedure of master determination processing will be described in detail with reference to FIGS. 16 to 18.

Figure 16:
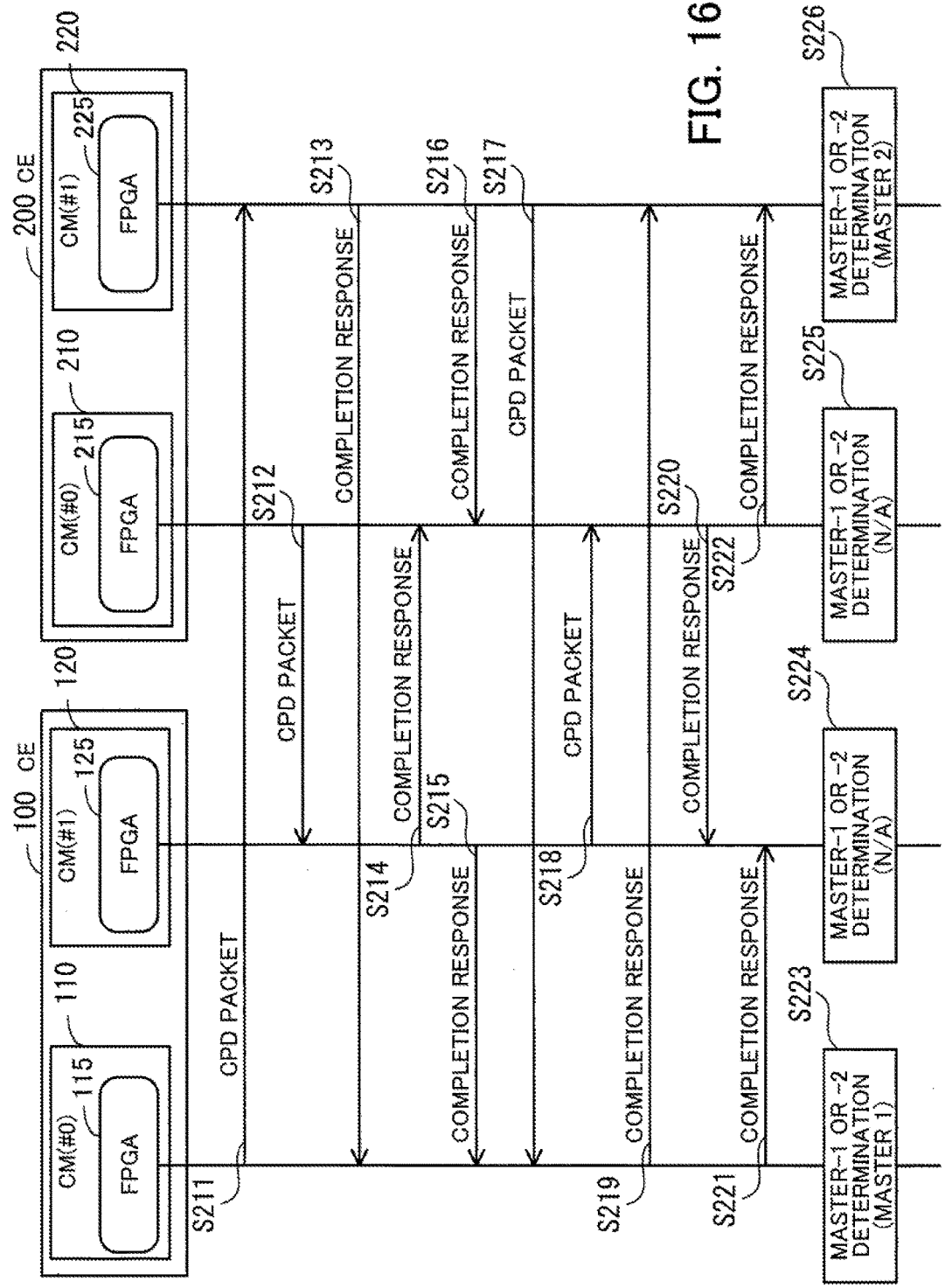
FIG. 16 is a first sequence diagram illustrating a procedure of master determination processing.

FIG. 16 is a first sequence diagrams illustrating a procedure of master determination processing. The FPGA 115 of the CM 110 whose CM number is "0" in the CE 100 transmits a CPD packet from its management port whose port number is "0" (step S211). In addition, the FPGA 215 of the CM 210 whose CM number is "0" in the CE 200 transmits a CPD packet from its management port whose port number is "1" (step S212). The FPGA 225 in the CM 220 receives the CPD packet from the FPGA 115. The FPGA 125 in the CM 120 receives the CPD packet from the FPGA 215.

When receiving the CPD packet, the FPGA 225 transmits a completion response to the CM 110 (step S213). Likewise, when receiving the CPD packet, the FPGA 125 transmits a completion response to the CM 210 (step S214). In addition, when receiving the CPD packet, the FPGA 125 transmits a completion response to the CM 110 of a different channel in the same CE 100 (step S215). In addition, when receiving the CPD packet, the FPGA 225 transmits a completion response to the CM 210 of a different channel in the same CE 200 (step S216).

Next, the FPGA 225 of the CM 220 whose CM number is "1" in the CE 200 transmits a CPD packet from each of the management ports whose port numbers are "0" and "1" (step S217). In addition, the FPGA 125 of the CM 120 whose CM number is "1" in the CE 100 transmits a CPD packet from each of the management ports whose port numbers are "0" and "1" (step S218). The FPGA 215 in the CM 210 receives the CPD packets from the FPGA 125. The FPGA 115 in the CM 110 receives the CPD packets from the FPGA 225.

When receiving the CPD packets, the FPGA 115 transmits a completion response to the CM 220 (step S219). Likewise, when receiving the CPD packets, the FPGA 215 transmits a completion response to the CM 120 (step S220). In addition, when receiving the CPD packets, the FPGA 115 transmits a completion response to the CM 120 of a different channel in the same CE 100 (step S221). In addition, when receiving the CPD packet, the FPGA 215 transmits a completion response to the CM 220 of a different channel in the same CE 200 (step S222).

When the FPGAs 115, 125, 215, and 225 receive completion responses corresponding to their respective CPD packets, the FPGAs 115, 125, 215, and 225 perform master determination on the basis of the CPD values. Namely, each of the FPGAs 115, 125, 215, and 225 determines whether its corresponding CM needs to serve as the master-1 CM or the master-2 CM (steps S223 to S226). In the example in FIG. 16, the FPGA 115 has determined that the CM 110 serves as the master-1 CM. In addition, the FPGA 225 has determined that the CM 220 serves as the master-2 CM.

After the master-1 and master-2 CMs are determined, processing for notifying the other CMs of the master-1 CM is performed so that the other CMs can detect the number of hops to the master-1 CM. Hereinafter, the master determination processing including the CM notification processing will be described.

Figure 17:
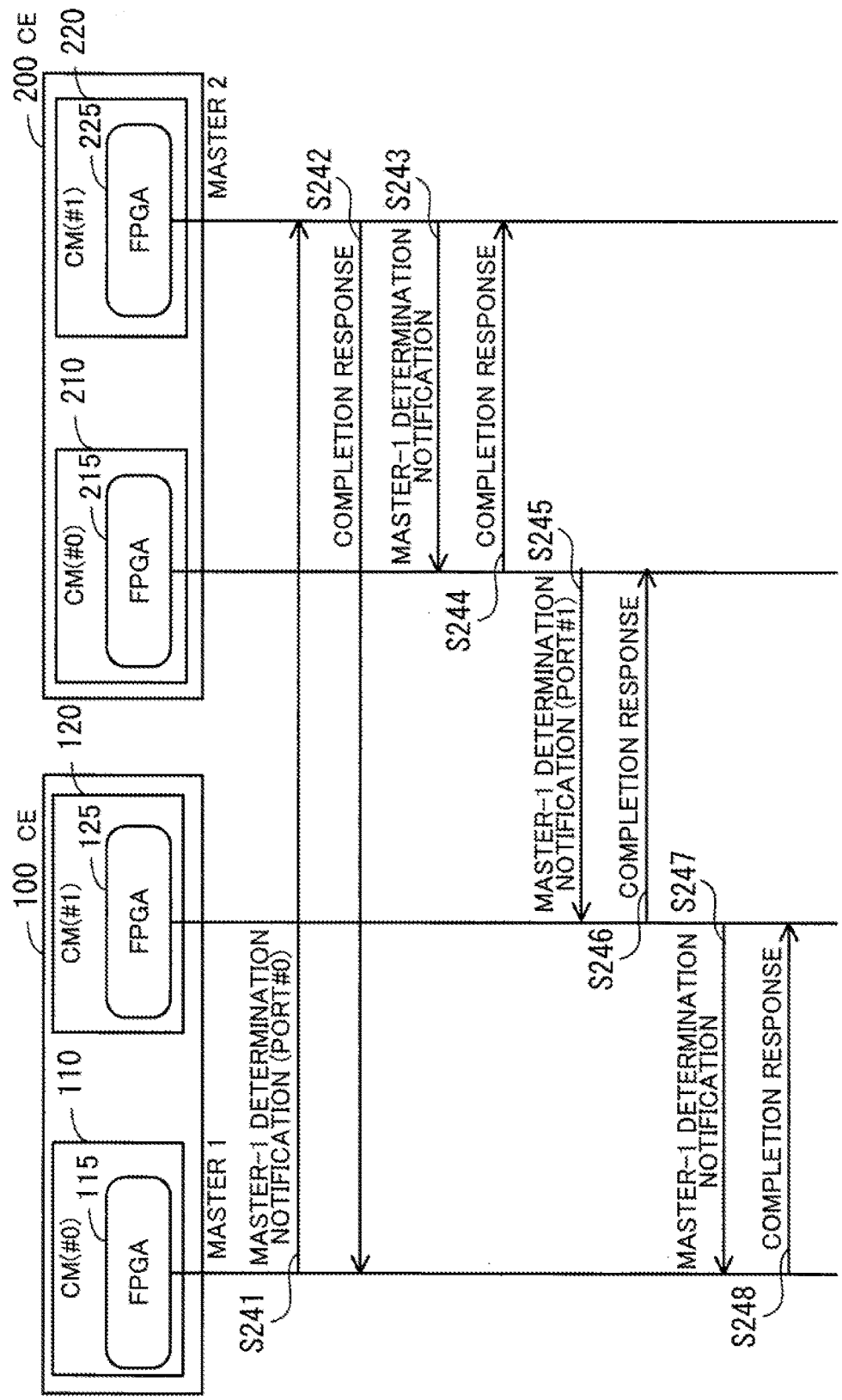
FIG. 17 is a second sequence diagram illustrating the procedure of master determination processing.

FIG. 17 is a second sequence diagram illustrating the procedure of the master determination processing. The processing for notifying the other CMs of the master-1 CM is performed through the routes via the two management ports of the FPGA 115 of the master-1 CM 110.

First, the FPGA 115 of the master-1 CM 110 transmits a master-1 determination notification packet from the management port 115a whose port number is "0" (step S241). The FPGA 225 of the CM 220 receives this master-1 determination notification packet transmitted from the FPGA 115. In the master-1 determination notification packet, for example, TID_CNT is set to addition transfer. In this way, each time the master-1 determination notification packet is relayed from CM to CM, the value of TID_VAL is incremented by 1. In addition, an individual FPGA that has received the master-1 determination notification packet detects the number of hops to the master-1 CM on the basis of TID_VAL in the received master-1 determination notification packet.

When receiving the master-1 determination notification packet, the FPGA 225 transmits a completion response to the CM 110 (step S242). In addition, the FPGA 225 transmits the master-1 determination notification packet to the CM 210 of a different channel in the same CE 200 through inter-CE communication (step S243).

When receiving the master-1 determination notification packet, the FPGA 215 of the CM 210 transmits a completion response to the CM 220 (step S244). In addition, the FPGA 215 transmits the master-1 determination notification packet from the management port 215b whose port number is "1" (step S245). The FPGA 125 of the CM 120 receives the master-1 determination notification packet transmitted from the FPGA 215.

When receiving the master-1 determination notification packet, the FPGA 125 transmits a completion response to the CM 210 (step S246). In addition, the FPGA 125 transmits the master-1 determination notification packet to the CM 110 of a different channel in the same CE 100 through inter-CE communication (step S247).

When receiving the master-1 determination notification packet, the FPGA 115 of the CM 110 transmits a completion response to the CM 120 (step S248).

When receiving the master-1 determination notification packet from the CM 120, the FPGA 115 determines that the notification through the route via the management port 115a whose port number is "0" has been completed. If the FPGA 115 does not receive the master-1 determination notification packet from the CM 120 within a predetermined time after the transmission of the master-1 determination notification packet in step S241, the FPGA 115 repeats step S241 until it receives the master-1 determination notification packet.

Figure 18:
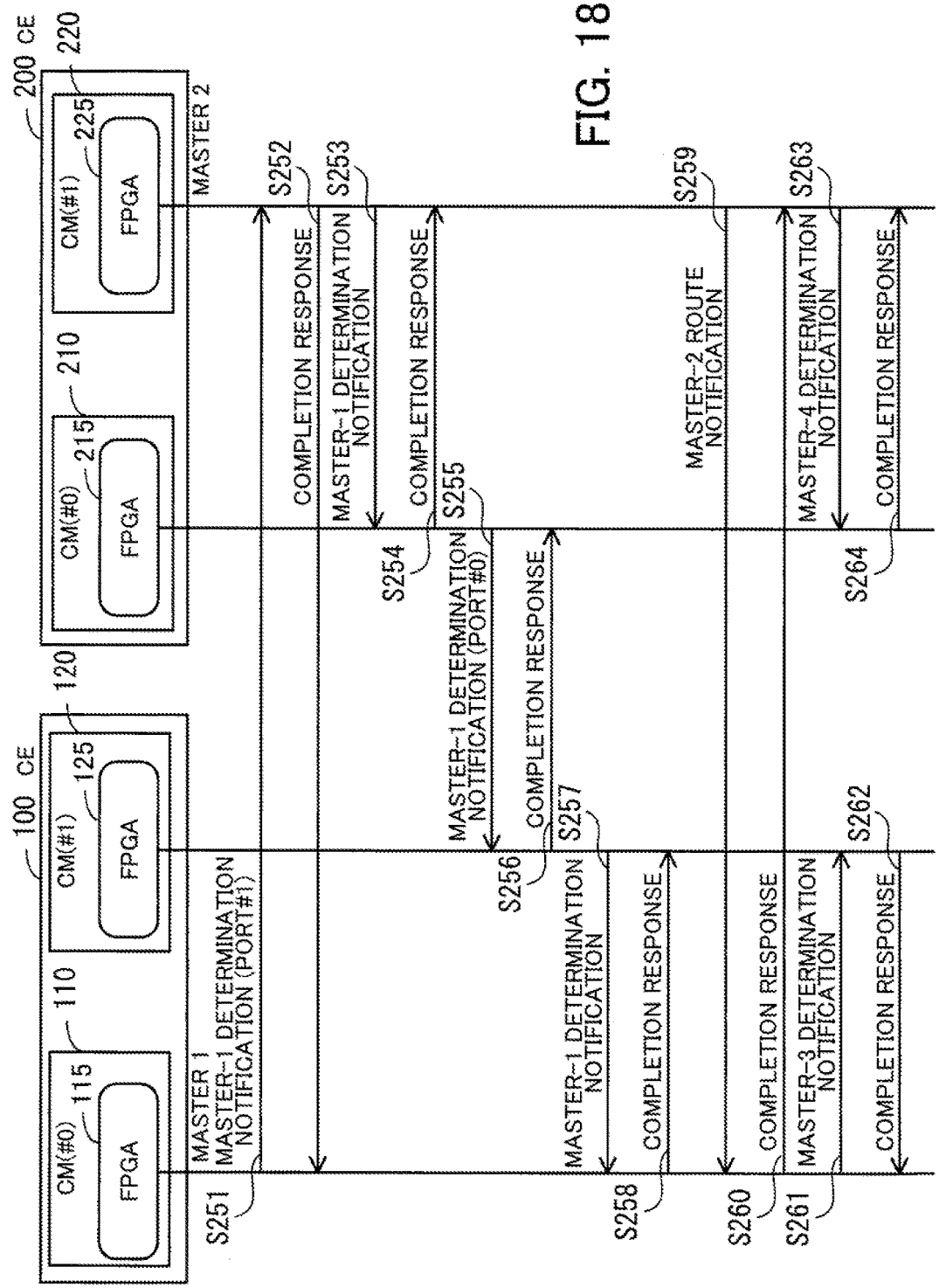
FIG. 18 is a third sequence diagram illustrating the procedure of master determination processing.

FIG. 18 is a third sequence diagram illustrating the procedure of the master determination processing. The FPGA 115 of the CM 110 transmits a master-1 determination notification packet from the management port 115b whose port number is "1" (step S251). The FPGA 225 of the CM 220 receives the master-1 determination notification packet transmitted from the FPGA 115.

When receiving the master-1 determination notification packet, the FPGA 225 transmits a completion response to the CM 110 (step S252). In addition, the FPGA 225 transmits the master-1 determination notification packet to the CM 210 of a different channel in the same CE 200 through inter-CE communication (step S253).

When receiving the master-1 determination notification packet, the FPGA 215 of the CM 210 transmits a completion response to the CM 220 (step S254). In addition, the FPGA 215 transmits the master-1 determination notification packet from the management port 215a whose port number is "0" (step S255). The FPGA 125 in the CM 120 receives the master-1 determination notification packet transmitted from the FPGA 215.

When receiving the master-1 determination notification packet, the FPGA 125 transmits a completion response to the CM 210 (step S256). In addition, the FPGA 125 transmits the master-1 determination notification packet to the CM 110 of a different channel in the same CE 100 through inter-CE communication (step S257).

When receiving the master-1 determination notification packet, the FPGA 115 of the CM 110 transmits a completion response to the CM 120 (step S258).

When receiving the master-1 determination notification packet from the CM 120, the FPGA 115 determines that the notification through the route via the management port 115b whose port number is "1" has been completed. If the FPGA 115 does not receive the master-1 determination notification packet from the CM 120 within a predetermined time after the transmission of the master-1 determination notification packet in step S251, the FPGA 115 repeats step S251 until it receives the master-1 determination notification packet.

When the notification of the determination of the master-1 CM is completed through the two routes, the FPGA 225 of the master-2 CM 220 is able to detect how many hops are needed from the master-1 CM 110 to the CM 220 through the two routes from TID_VAL in the received master-1 determination notification packets, respectively. Next, the FPGA 225 of the CM 220 transmits a master-2 route notification packet to the master-1 CM 110 (step S259). For example, the number of hops to the CM 110 is set in TID_SET and subtraction transfer is specified in TID_CNT in the master-2 route notification packet. The FPGA 115 of the master-1 CM 110 refers to the value of the TID_SET in the received master-2 route notification packet and recognizes the number of hops to the master-2 CM 220. When receiving the master-2 route notification packet, the FPGA 115 of the CM 110 transmits a completion response to the CM 220 on the basis of the number of hops to the CM 220 (step S260).

Next, the FPGA 115 of the CM 110 transmits a master-3 determination notification packet to the CM 120 in the same CE 100. This packet indicates that the CM 120 needs to serve as the master-3 CM (step S261). When receiving the master-3 determination notification packet, the FPGA 125 of the CM 120 transmits a completion response to the CM 110 (step S262).

In addition, the FPGA 225 of the CM 220 transmits a master-4 determination notification packet to the CM 210 in the same CE 200. This packet indicates that the CM 210 needs to serve as the master-4 CM (step S263). When receiving the master-4 determination notification packet, the FPGA 215 of the CM 210 transmits a completion response to the CM 220 (step S264).

In this way, by causing the CMs 110, 120, 210, and 220 to coordinate with each other, the CMs serving as the master-1 to master-4 CMs are determined. Since the FPGAs 115, 125, 215, and 225 in the CMs 110, 120, 210, and 220 perform the master determination processing, the masters are determined without involving a processor of a different CM (processing of a processor based on firmware).

The master-1 CM 110 manages the other CMs 120, 210, and 220. For example, the CM 110 collects operation logs from the other CMs 120, 210, and 220. In addition, each of the CMs 110, 120, 210, and 220 serving as the master-1 to master-4 CMs monitors a corresponding CM serving as a master and is prepared for malfunction of the corresponding monitoring target CM.

FIG. 19 illustrates an example of monitoring targets. In the second embodiment, for example, the master-1 CM monitors the operation of the master-2 CM. The master-2 CM monitors the operation of the master-1 CM. The master-3 CM monitors the operation of the master-1 CM. The master-4 CM monitors the operation of the master-2 CM.

The monitoring of the individual CMs is performed by WatchDog communication, for example. More specifically, WatchDog communication is performed between a monitoring CM and its monitoring target CM. For example, a monitoring CM regularly transmits a heartbeat request to its monitoring target CM. If a CM monitoring a monitoring target CM does not receive a response to a heartbeat request from the monitoring target CM within a certain time after the transmission of the heartbeat request, the monitoring CM retransmits the heartbeat request a predetermined number of times. If the monitoring CM does not receive a response after retransmitting the heartbeat request the predetermined number of times, the monitoring CM determines that the monitoring target CM has malfunctioned.

If the master level of a monitoring target CM is higher than its monitoring CM, the monitoring target CM delivers information (system information) about the operation status of the entire storage system to the monitoring CM by using mirroring. For example, the FPGA of the master-1 CM simultaneously delivers the system information aggregated by this CM to the master-2 CM and the master-3 CM without involving a processor of the CM. The FPGA of the master-2 CM that has received the system information from the master-1 CM delivers the received system information to the master-4 CM without involving a processor of the CM.

Since the system information is delivered in advance by using mirroring in this way, even when a higher master level CM malfunctions, a lower master level CM monitoring the malfunctioning CM can switch to the higher master level CM through failover processing. The malfunctioning CM will not serve as a master at any level after the failover processing. Hereinafter, switching from a master to a non-master will be referred to as "degradation."

FIG. 20 illustrates an example of failover processing performed when a master CM malfunctions. For example, if the master-1 CM malfunctions and is degraded, the master-2 CM switches to the master-1 CM through failover processing. The master-3 CM switches to the master-2 CM through failover processing. The master-4 CM switches to the master-3 CM through failover processing.

If the master-2 CM malfunctions and is degraded, the master-4 CM switches to the master-2 CM through failover processing. If any one of the master-3 and master-4 CMs malfunctions and is degraded, the master levels of the other CMs are not changed.

There are cases in which two of the four master CMs simultaneously malfunction. In such cases, the properly operating CMs serve as the master-1 and master-2 CMs, respectively.

FIG. 21 illustrates an example of failover processing performed when two master CMs malfunction. For example, if the master-1 CM and the master-3 CM simultaneously malfunction and are both degraded, the master-2 CM switches to the master-1 CM through failover processing. The master-4 CM switches to the master-2 CM through failover processing. If the master-2 CM and the master-4 CM simultaneously malfunction and are both degraded, the master-3 CM switches to the master-2 CM through failover processing. If the master-1 CM and the master-2 CM simultaneously malfunction and are both degraded, the master-3 CM switches to the master-1 CM through failover processing. The master-4 CM switches to the master-2 CM through failover processing. If the master-3 CM and the master-4 CM simultaneously malfunction and are both degraded, no failover processing is performed.

Next, using the connection state illustrated in FIG. 13 as an example, the monitoring among the master CMs, the mirroring of the system information, and the failover processing performed when a malfunction occurs will be described in detail.

Figure 22:
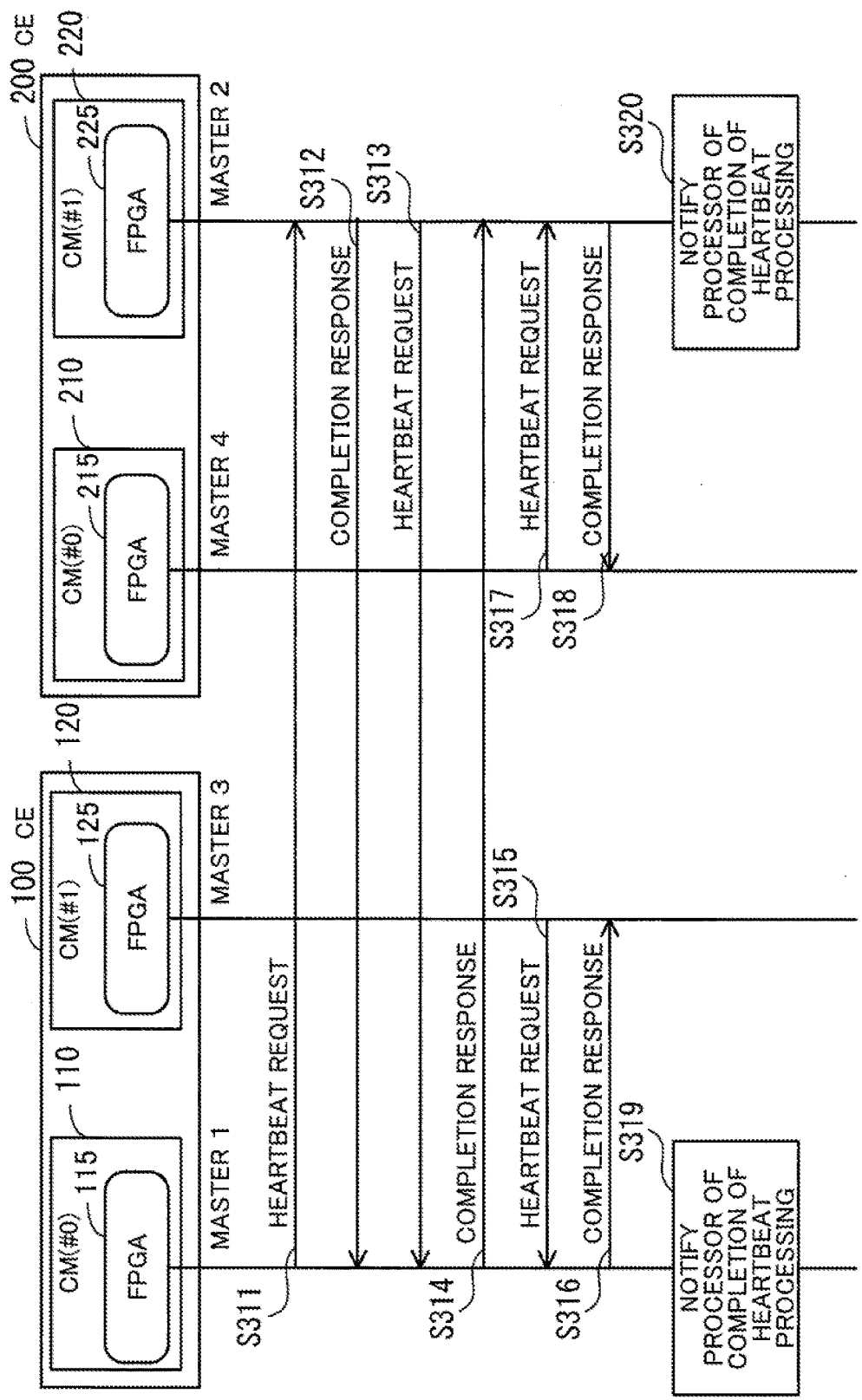
FIG. 22 is a sequence diagram illustrating an example of the monitoring processing performed by the master CMs.

FIG. 22 is a sequence diagram illustrating an example of the monitoring processing performed by the master CMs. The FPGA 115 of the master-1 CM 110 transmits a heartbeat request to the master-2 CM 220, in order to determine whether the master-2 CM 220 is alive (step S311). The FPGA 225 of the CM 220 receives the heartbeat request transmitted from the FPGA 115. When receiving the heartbeat request, the FPGA 225 transmits a completion response to the CM 110 (step S312).

The FPGA 225 of the master-2 CM 220 transmits a heartbeat request to the master-1 CM 110, in order to determine whether the master-1 CM is alive (step S313). The FPGA 115 of the CM 110 receives the heartbeat request transmitted from the FPGA 225. When receiving the heartbeat request, the FPGA 115 transmits a completion response to the CM 220 (step S314).

The FPGA 125 transmits a heartbeat request to the master-1 CM 110, in order to determine whether the master-1 CM is alive (step S315). The FPGA 115 of the CM 110 receives the heartbeat request transmitted from the FPGA 125. When receiving the heartbeat request, the FPGA 115 transmits a completion response to the CM 120 (step S316).

The FPGA 215 transmits a heartbeat request to the master-2 CM 220, in order to determine whether the master-2 CM is alive (step S317). The FPGA 225 of the CM 220 receives the heartbeat request transmitted from the FPGA 215. When receiving the heartbeat request, the FPGA 225 transmits a completion response to the CM 210 (step S318).

After successfully transmitting the heartbeat request and receiving the corresponding completion response, namely, after the WatchDog communication is completed without problem, the FPGA 115 of the master-1 CM 110 notifies the processor in the CM 110 of the completion of the heartbeat processing (step S319). After the WatchDog communication is completed without problem, the FPGA 225 of the master-2 CM 220 notifies the processor in the CM 220 of the completion of the heartbeat processing (step S320).

Figure 23:
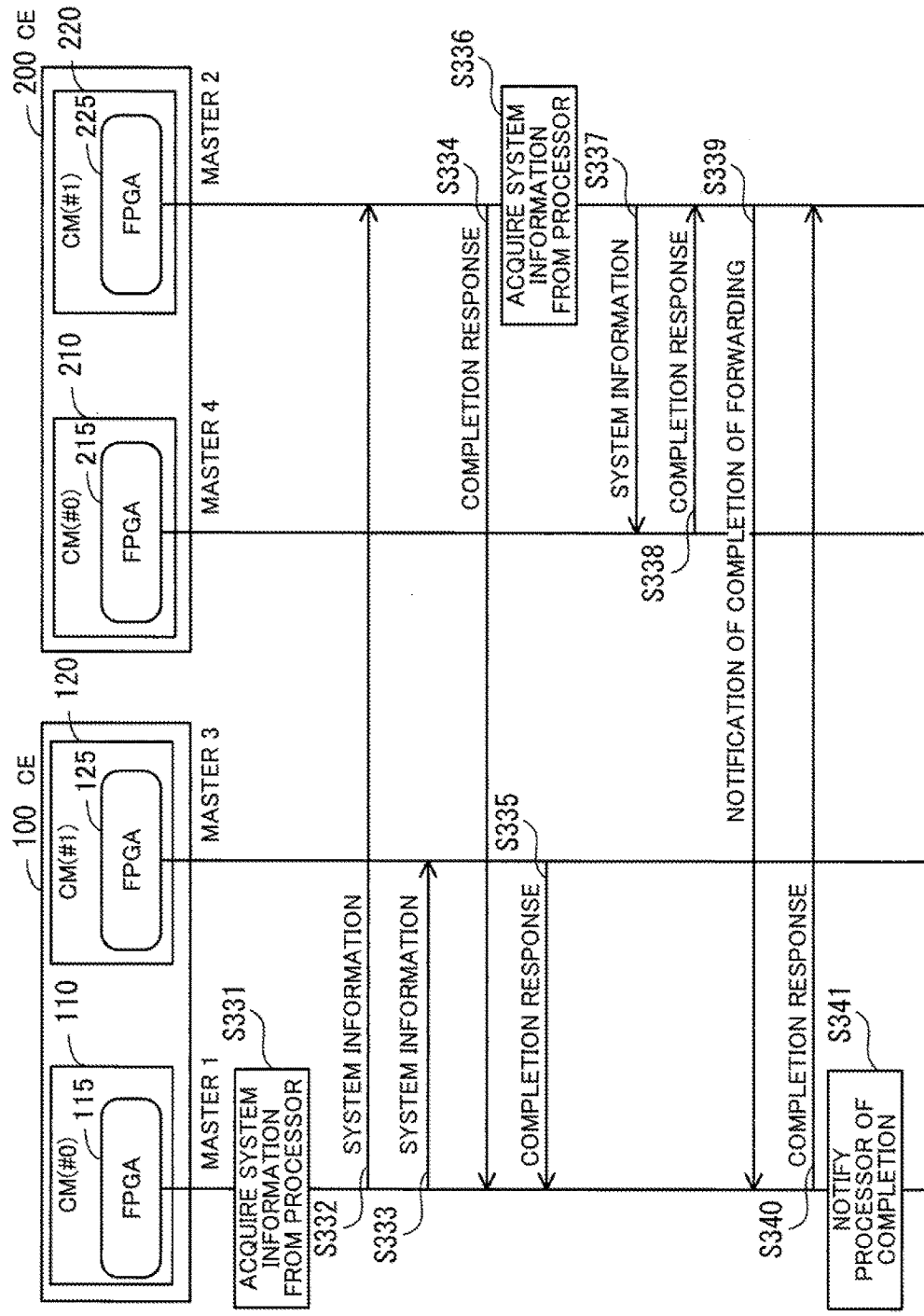
FIG. 23 is a sequence diagram illustrating an example of mirroring processing in the system information.

FIG. 23 is a sequence diagram illustrating an example of system information mirroring processing. After completion of the WatchDog communication, the processor of the CM 110 instructs the FPGA 115 to perform mirror arrangement of the system information. In accordance with this instruction, the FPGA 115 acquires the system information, which the processor of the CM 110 has collected from the entire storage system, from the processor (step S331). The acquired system information is temporarily held in the storage unit 115d.

The FPGA 115 transmits the acquired system information to the master-2 CM 220 and the master-3 CM 120 (steps S332 and S333). The FPGA 225 of the CM 220 and the FPGA 125 of the CM 120 receive the system information transmitted from the FPGA 115. The system information received by the FPGA 225 is transmitted to and managed by the processor of the CM 220. The system information received by the FPGA 125 is transmitted to and managed by the processor of the CM 120. When receiving the system information, the FPGA 225 transmits a completion response to the CM 110 (step S334). In addition, when receiving the system information, the FPGA 125 transmits a completion response to the CM 110 (step S335).

Next, the processor of the CM 220 instructs the FPGA 225 to perform mirror arrangement of the system information. In accordance with this instruction, the FPGA 225 acquires the system information managed by the processor of the CM 220 from the processor (step S336). The FPGA 225 transmits the acquired system information to the master-4 CM 210 (step S337). The FPGA 215 of the CM 210 receives the system information transmitted from the FPGA 225. The system information received by the FPGA 215 is transmitted to and managed by the processor of the CM 210. When receiving the system information, the FPGA 215 transmits a completion response to the CM 220 (step S338).

The FPGA 225 transmits a notification of the completion of the transfer of the system information to the master-1 CM 110 (step S339). The FPGA 115 of the CM 110 receives this notification. When receiving the notification, the FPGA 115 transmits a completion response to the CM 220 (step S340).

Next, the FPGA 115 of the CM 110 notifies the processor in the CM 110 of the completion of the transfer of the system information (step S341).

In this way, the FPGAs 115, 125, 215, and 225 transfer the system information, without involving the processors of the CMs 110, 120, 210, and 220. Since the CMs 110, 120, 210, and 220 are provided with the system information in advance, even if any of the CMs malfunctions, failover processing is promptly performed.

Figure 24:
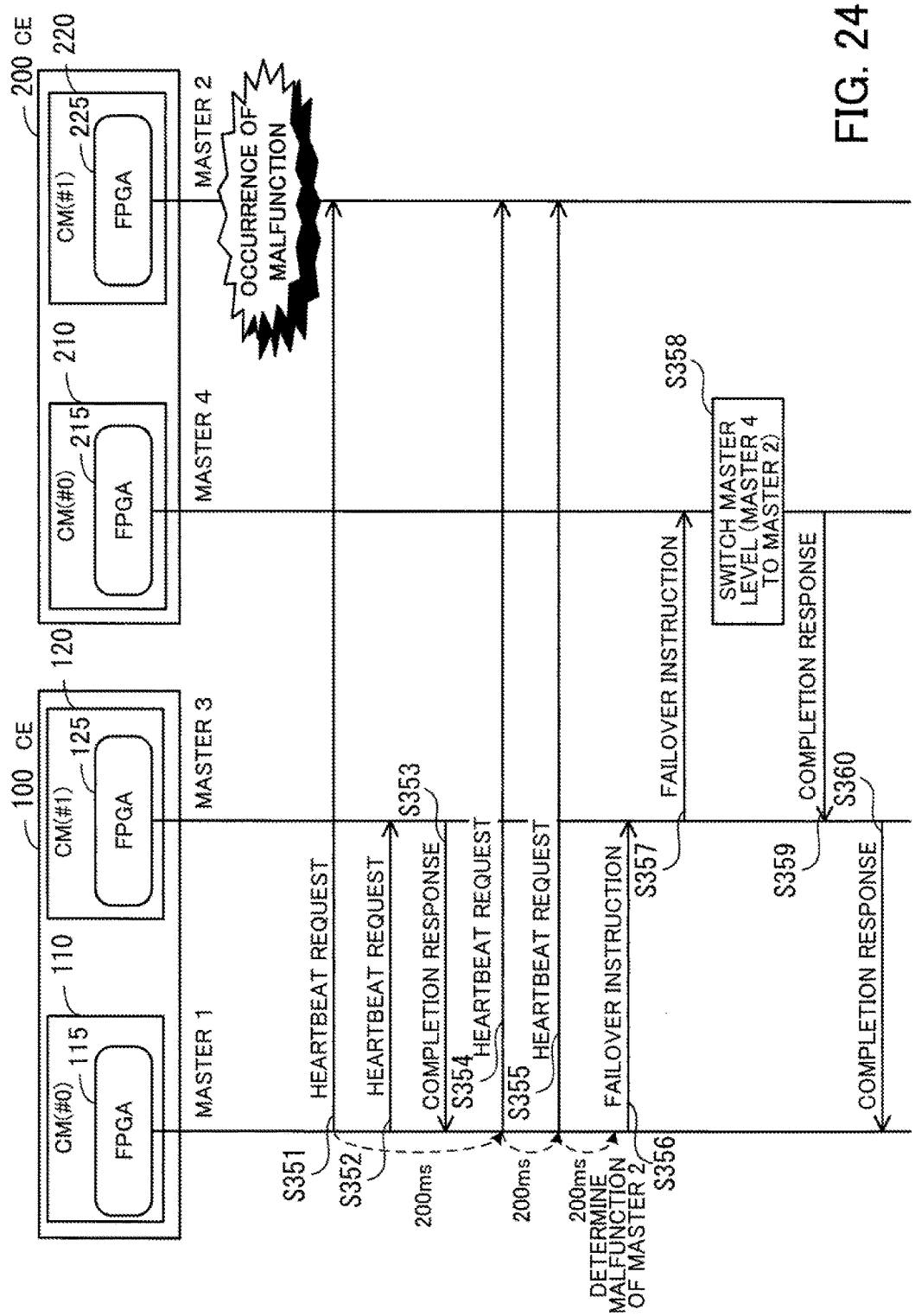
FIG. 24 is a sequence diagram illustrating an example of a procedure of failover processing.

FIG. 24 is a sequence diagram illustrating an example of a procedure of failover processing. FIG. 24 illustrates an example of failover processing performed when the master-2 CM 220 malfunctions. The master-1 CM 110 and the master-2 CM 220 monitor each other, and each of the CMs transmits a heartbeat request to the other. In this case, if the FPGA 115 of the master-1 CM 110 does not receive a completion response from the CM 220 in response to a heartbeat request, the FPGA 115 may determine that the CM 220 has malfunctioned. If the FPGA 115 does not receive a heartbeat request, which is supposed to be regularly transmitted from the CM 220, for a predetermined time or more, the FPGA 115 may determine that the CM 220 has malfunctioned. In the example in FIG. 24, if the FPGA 115 does not receive a completion response, the FPGA 115 determines that the CM 220 has malfunctioned.

The FPGA 115 of the master-1 CM 110 transmits a heartbeat request to the master-2 CM 220 and the master-3 CM 120 (steps S351 and S352). Since the CM 120 is properly operating, the FPGA 125 transmits a completion response to the CM 110 (step S353). However, since the CM 220 has malfunctioned, the FPGA 115 of the CM 110 does not receive a completion response from the CM 220.

If the FPGA 115 does not receive a completion response within 200 ms after transmitting the heartbeat request, the FPGA 115 transmits a heartbeat request again (second time) (step S354). If the FPGA 115 does not receive a completion response in response to the retransmitted heartbeat request, the FPGA 115 transmits a heartbeat request again (third time) 200 ms after the retransmission of the heartbeat request (step S355).

If the FPGA 115 does not receive a completion response in response to the third heartbeat request, the FPGA 115 transmits a failover instruction addressed to the master-4 CM 210 to the CM 120 (step S356). The FPGA 125 of the CM 120 transfers the failover instruction to the CM 210 (step S357).

When receiving the failover instruction, the FPGA 215 of the CM 210 switches its master level from "master 4" to "master 2" (step S358). Next, the FPGA 215 transmits a completion response addressed to the CM 110 to the CM 120 (step S359). The FPGA 125 of the CM 120 transfers the completion response to the CM 110 (step S360).

As described above, even when the master-2 CM malfunctions, failover processing is promptly performed, and a different CM is able to manage all the CMs in the storage system in place of the malfunctioning CM.

There are various possible connection modes that satisfy the conditions about the connection of the management cables.

Figure 25:
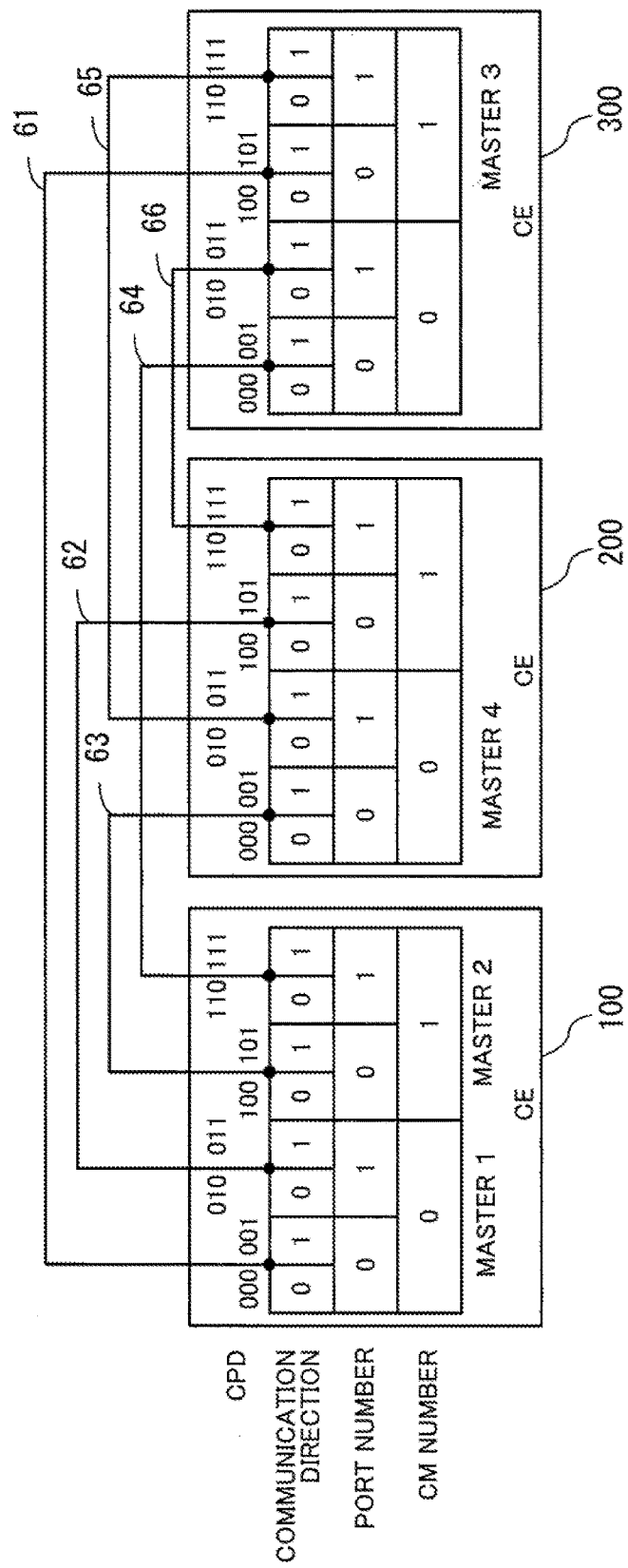
FIG. 25 illustrates another connection mode among CMs.

FIG. 25 illustrates a variation of the connection mode among the CMs. In the example in FIG. 25, three CEs 100, 200, and 300 are arranged.

The management port whose port number is "0" of the CM whose CM number is "0" in the CE 100 is connected to the management port whose port number is "0" of the CM whose CM number is "1" in the CE 300 via a management cable 61. In addition, the management port whose port number is "1" of the CM whose CM number is "0" in the CE 100 is connected to the management port whose port number is "0" of the CM whose CM number is "1" in the CE 200 via a management cable 62. In addition, the management port whose port number is "0" of the CM whose CM number is "1" in the CE 100 is connected to the management port whose port number is "0" of the CM whose CM number is "0" in the CE 200 via a management cable 63. In addition, the management port whose port number is "1" of the CM whose CM number is "1" in the CE 100 is connected to the management port whose port number is "0" of the CM whose CM number is "0" in the CE 300 via a management cable 64. In addition, the management port whose port number is "1" of the CM whose CM number is "0" in the CE 200 is connected to the management port whose port number is "1" of the CM whose CM number is "1" in the CE 300 via a management cable 65. In addition, the management port whose port number is "1" of the CM whose CM number is "1" in the CE 200 is connected to the management port whose port number is "1" of the CM whose CM number is "0" in the CE 300 via a management cable 66.

In this case, the CM 110 whose CM number is "0" in the CE 100 serves as the master-1 CM. The CM 120 whose CM number is "1" in the CE 100 serves as the master-2 CM. In this case, the different CM 120 in the same CE 100 with the master-1 CM 110 already serves as the master-2 CM. Thus, the CM 120 cannot serve as the master-3 CM. When such a conflict occurs between masters, for example, a different CM connected via the management port whose port number is "0" of the master-1 CM 110 serves as the master-3 CM. In the example in FIG. 25, the CM 320 whose CM number is "1" in the CE 300 serves as the master-3 CM. There is also a conflict regarding the master-4 CM. In this case, a different CM connected via the management port whose port number is "0" of the master-2 CM 120 serves as the master-4 CM. In the example in FIG. 25, the CM 210 whose CM number is "0" in the CE 200 serves as the master-4 CM.

As described above, as long as the connection conditions of the management cables are satisfied, various connection modes are applicable. By causing the FPGAs of the CMs to perform the above communication using control packets via the management cables, the monitoring processing including DC-ON control, master determination, and failover are performed.

Next, as an example, processing performed by the FPGA 115 of the CM 110 will be described in detail.

Figure 26:
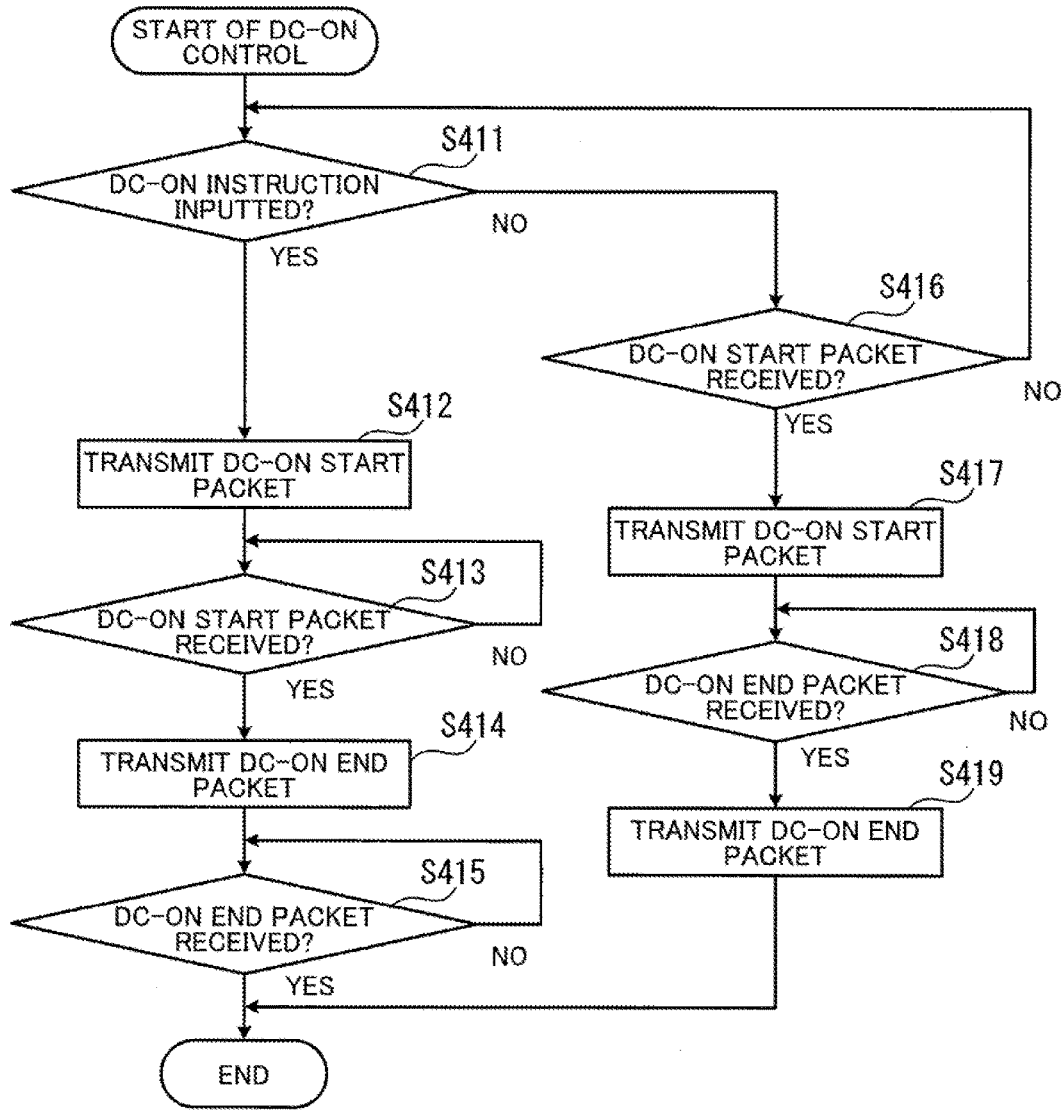
FIG. 26 is a flowchart illustrating an example of a procedure of DC-ON control processing performed by an FPGA.

FIG. 26 is a flowchart illustrating an example of a procedure of the DC-ON control processing performed by the FPGA 115. The processing illustrated in FIG. 26 will be described along with step numbers.

[Step S411] The DC-ON control unit 115e determines whether a DC-ON instruction has been inputted. If a DC-ON instruction has been inputted, the DC-ON control unit 115e starts to supply DC power to the CM 110, and the processing proceeds to step S412. Otherwise, the processing proceeds to step S416.

[Step S412] The DC-ON control unit 115e transmits a DC-ON start packet to a CM in a CE to which the DC-ON control unit 115e is connected via a management cable. After the DC-ON control unit 115e receives a completion response in response to the DC-ON start packet, the processing proceeds to step S413.

[Step S413] The DC-ON control unit 115e determines whether it has received a DC-ON start packet from the CM 120 in the same CE 100. If the DC-ON control unit 115e has received a DC-ON start packet, the DC-ON control unit 115*e* transmits a completion response to the CM 120, and the processing proceeds to step S414. The DC-ON control unit 115*e* repeats the determination in step S413 until it receives a DC-ON start packet.

[Step S414] The DC-ON control unit 115*e* transmits a DC-ON end packet to the CM in the CE to which the DC-ON control unit 115*e* is connected via the management cable. After the DC-ON control unit 115*e* receives a completion response in response to the DC-ON end packet, the processing proceeds to step S415.

[Step S415] The DC-ON control unit 115*e* determines whether it has received a DC-ON end packet from the CM 120 in the same CE 100. If the DC-ON control unit 115*e* has received a DC-ON end packet, the DC-ON control unit 115*e* transmits a completion response to the CM 120, and the processing proceeds to "END." The DC-ON control unit 115*e* repeats the determination in step S415 until it receives a DC-ON end packet.

[Step S416] The DC-ON control unit 115*e* determines it has received a DC-ON start packet from a different CM. If the DC-ON control unit 115*e* has received a DC-ON start packet, the DC-ON control unit 115*e* transmits a completion response to the CM that has transmitted the DC-ON start packet. In addition, the DC-ON control unit 115*e* starts to supply DC power to the CM 110, and the processing proceeds to step S417. If the DC-ON control unit 115*e* has not received a DC-ON start packet, the processing returns to step S411.

[Step S417] The DC-ON control unit 115*e* transmits a DC-ON start packet to a CM different from the CM that has transmitted the received DC-ON start packet. After the DC-ON control unit 115*e* receives a completion response in response to the DC-ON start packet, the processing proceeds to step S418.

[Step S418] The DC-ON control unit 115*e* determines whether it has received a DC-ON end packet from a different CM. If the DC-ON control unit 115*e* has received a DC-ON end packet, the DC-ON control unit 115*e* transmits a completion response to the CM that has transmitted the DC-ON end packet, and the processing proceeds to step S419. If the DC-ON control unit 115*e* has not received a DC-ON end packet, the DC-ON control unit 115*e* repeats the determination in step S418.

[Step S419] The DC-ON control unit 115*e* transmits a DC-ON end packet to a CM different from the CM that has transmitted the received DC-ON end packet. After the DC-ON control unit 115*e* receives a completion response in response to the DC-ON end packet, the processing proceeds to "END."

In this way, the FPGA 115 controls DC-ON of the CM 110.

Next, the master determination processing performed by the FPGA 115 will be described in detail.

Figure 27:
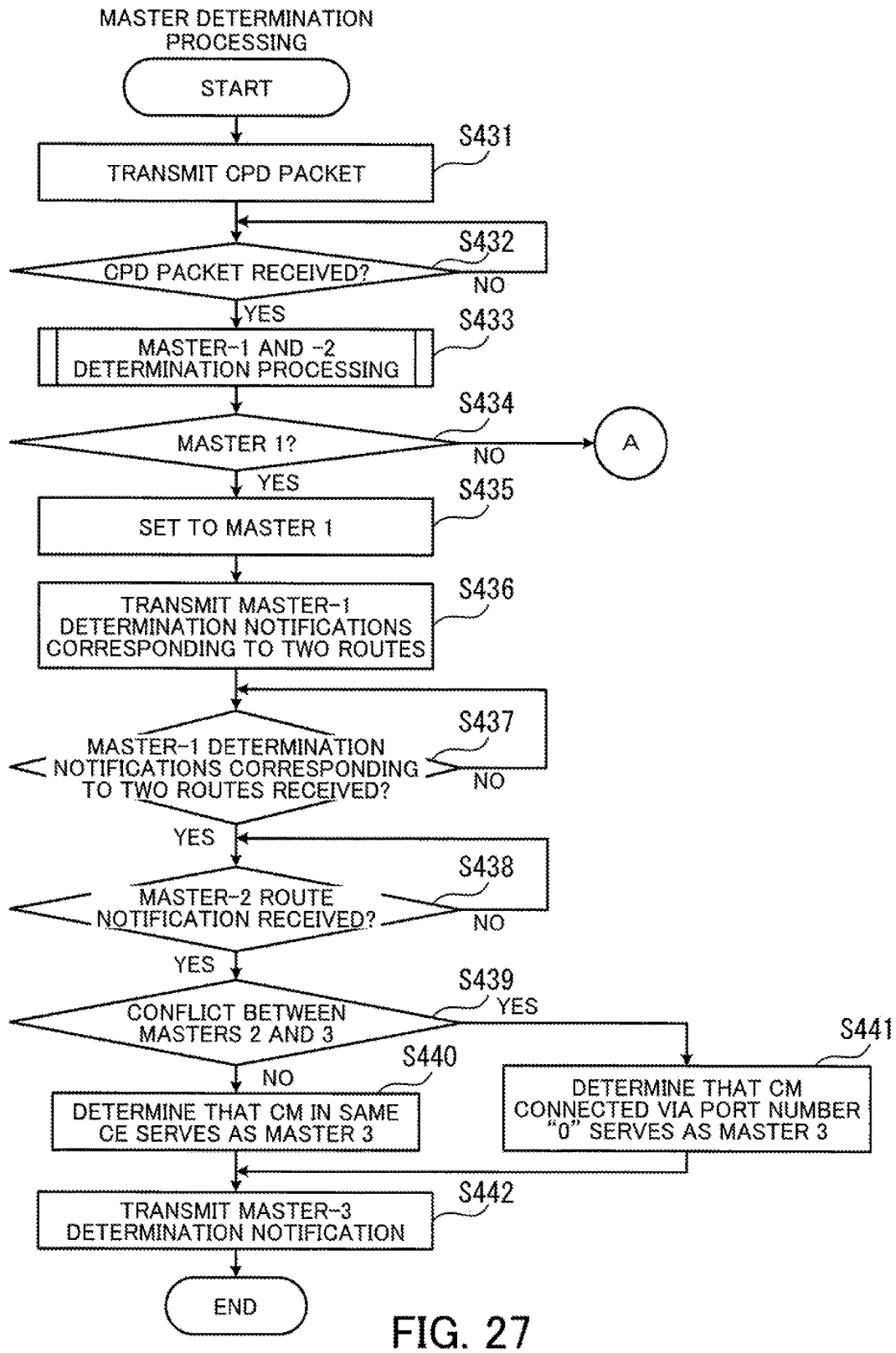
FIG. 27 is a first flowchart illustrating an example of a procedure of master determination processing performed by an FPGA.

FIG. 27 is a first flowchart illustrating an example of a procedure of the master determination processing performed by the FPGA 115. The processing illustrated in FIG. 27 will be described along with step numbers.

[Step S431] The master determination unit 115*f* transmits a CPD packet from each of the two management ports to a different CM. When the master determination unit 115*f* receives a completion response in response to the CPD packet, the processing proceeds to step S432.

[Step S432] The master determination unit 115*f* determines whether it has received a CPD packet from the different CM. If the master determination unit 115*f* has received a CPD packet, the master determination unit 115*f* transmits a completion response to the CM that has transmitted the CPD packet, and the processing proceeds to step S433. The master determination unit 115*f* repeats the determination in step S432 until it receives a CPD packet.

[Step S433] The master determination unit 115*f* performs master-1 and -2 determination processing. This processing will be described in detail below (see FIG. 29).

[Step S434] The master determination unit 115*f* determines whether the CM 110 has been determined to serve as the master-1 CM as a result of the master-1 and -2 determination processing. If the CM 110 has been determined to serve as the master-1 CM, the processing proceeds to step S435. If not, the processing proceeds to step S451 (see FIG. 28).

[Step S435] The master determination unit 115*f* sets the master level of the CM 110 to "master 1."

[Step S436] The master determination unit 115*f* transmits master-1 determination notification packets corresponding to two routes from the two management ports 115*a* and 115*b* of the FPGA 115. When the master determination unit 115*f* receives completion responses in response to the transmitted master-1 determination notification packets corresponding to the two routes, the processing proceeds to step S437.

[Step S437] The master determination unit 115*f* determines whether master-1 determination notification packets corresponding to the two routes from a different CM. Each time the master determination unit 115*f* receives a master-1 determination notification packet, the master determination unit 115*f* transmits a completion response to the CM that has transmitted the master-1 determination notification packet. If the master determination unit 115*f* has received the master-1 determination notification packets corresponding to the two routes, the processing proceeds to step S438. The master determination unit 115*f* repeats the determination in step S437 until it receives the master-1 determination notification packets corresponding to the two routes.

[Step S438] The master determination unit 115*f* determines whether it has received a master-2 route notification packet from a different CM. If the master determination unit 115*f* has received a master-2 route notification packet, the processing proceeds to step S439. The master determination unit 115*f* repeats the determination in step S438 until it receives a master-2 route notification packet.

[Step S439] The master determination unit 115*f* determines whether the master-2 CM conflicts with the first candidate for the master-3 CM. For example, if the CM 120, which is included in the same CE 100 with the CM 110, serves as the master-2 CM, a conflict occurs. If there is no conflict, the processing proceeds to step S440. If there is a conflict, the processing proceeds to step S441.

[Step S440] The master determination unit 115*f* determines that the CM 120 in the same CE 100 with the CM 110 serves as the master-3 CM. Next, the processing proceeds to step S442.

[Step S441] The master determination unit 115*f* determines that the CM connected via the management port 115*a* whose port number is "0" of the FPGA 115 serves as the master-3 CM.

[Step S442] The master determination unit 115*f* transmits a master-3 determination notification packet to the CM determined to serve as the master-3 CM. After the master determination unit 115*f* receives a completion response in response to the master-3 determination notification packet, the processing proceeds to "END."

Figure 28:
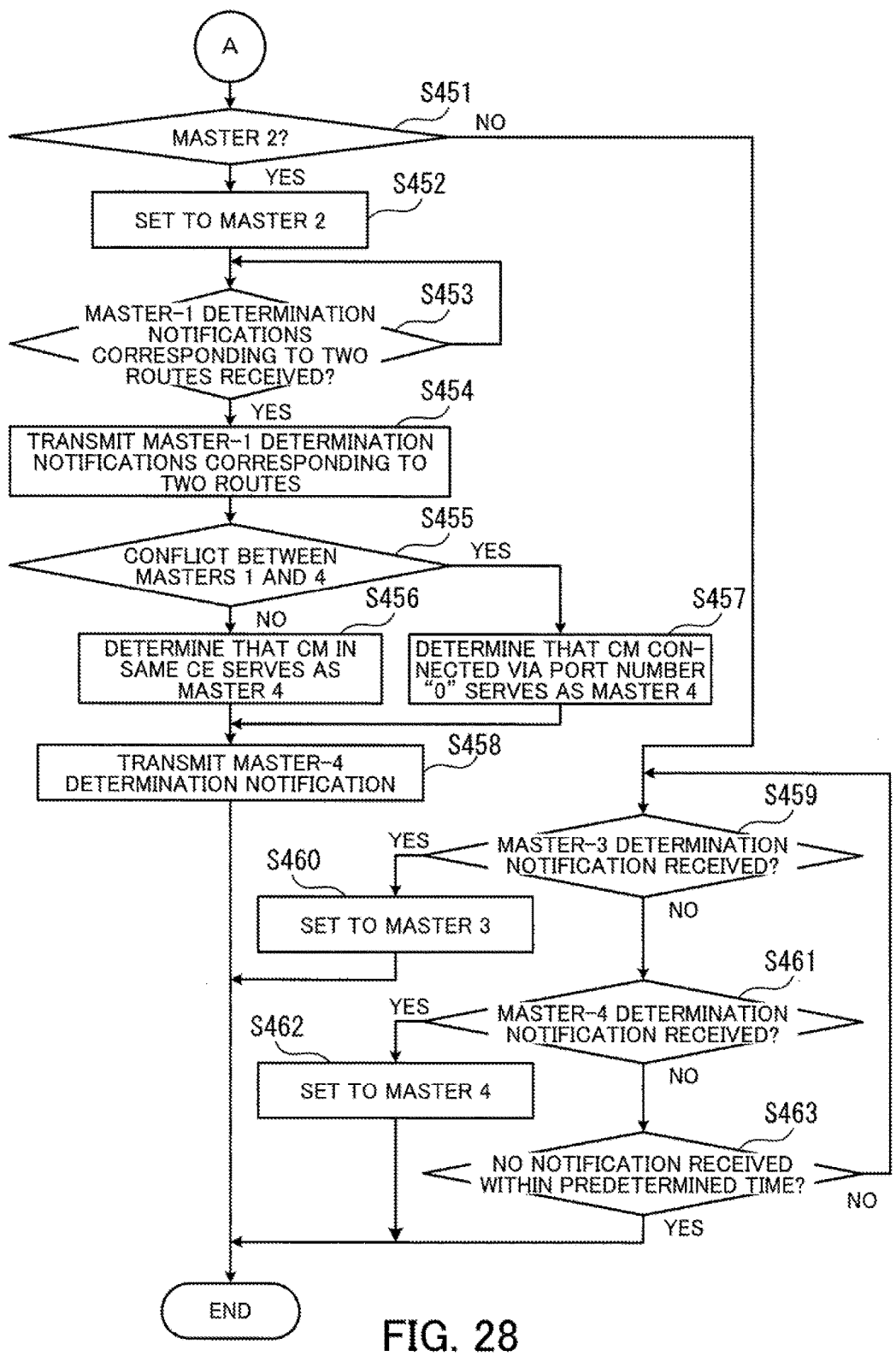
FIG. 28 is a second flowchart illustrating the example of the procedure of master determination processing performed by the FPGA.

FIG. 28 is a second flowchart illustrating the example of the procedure of the master determination processing performed by the FPGA. The processing illustrated in FIG. 28 will be described along with step numbers.

[Step S451] The master determination unit 115*f* determines whether the CM 110 has been determined to serve as the master-2 CM as a result of the master-1 and -2 determination processing. If the CM 110 has been determined to serve as the master-2 CM, the processing proceeds to step S452. If not, the processing proceeds to step S459.

[Step S452] The master determination unit 115*f* sets the master level of the CM 110 to "master 2."

[Step S453] The master determination unit 115*f* determines whether it has received master-1 determination notification packets from a different CM. The master determination unit 115*f* receives master-1 determination notification packets via two respective routes. If the master determination unit 115*f* has received the master-1 determination notification packets, the master determination unit 115*f* transmits a completion response to the CM that has transmitted the master-1 determination notification packets, and the processing proceeds to step S454. The master determination unit 115*f* repeats the determination in step S453 until it receives the master-1 determination notification packets corresponding to the two routes.

[Step S454] If the master determination unit 115*f* has received the master-1 determination notification packets, the master determination unit 115*f* transmits master-1 determination notification packets to a CM different from the CM that has transmitted the master-1 determination notification packets. After the master determination unit 115*f* transmits the master-1 determination notification packets corresponding to the two routes and receives completion responses in response to the master-1 determination notification packets, the processing proceeds to step S455.

[Step S455] The master determination unit 115*f* determines whether the master-1 CM conflicts with the first candidate for the master-4 CM. For example, if the CM 120 in the same CE 100 with the CM 110 serves as the master-1 CM, a conflict occurs. If there is no conflict, the processing proceeds to step S456. If there is a conflict, the processing proceeds to step S457.

[Step S456] The master determination unit 115*f* determines that the CM 120 in the same CE 100 with the CM 110 serves as the master-4 CM. Next, the processing proceeds to step S458.

[Step S457] The master determination unit 115*f* determines that the CM connected via the management port 115*a* whose port number is "0" of the FPGA 115 serves as the master-4 CM.

[Step S458] The master determination unit 115*f* transmits a master-4 determination notification packet to the CM determined to serve as the master-4 CM. When the master determination unit 115*f* receives a completion response in response to the master-4 determination notification packet, the processing proceeds to "END."

[Step S459] The master determination unit 115*f* determines whether it has received a master-3 determination notification packet. If the master determination unit 115*f* has received a master-3 determination notification packet, the master determination unit 115*f* transmits a completion response to the CM that has transmitted the master-3 determination notification packet, and the processing proceeds to step S460. If the master determination unit 115*f* has not received a master-3 determination notification packet, the processing proceeds to step S461.

[Step S460] The master determination unit 115*f* sets the master level of the CM 110 to "master 3," and the processing proceeds to "END."

[Step S461] The master determination unit 115*f* determines whether it has received a master-4 determination notification packet. If the master determination unit 115*f* has received a master-4 determination notification packet, the master determination unit 115*f* transmits a completion response to the CM that has transmitted the master-4 determination notification packet, and the processing proceeds to step S462. If the master determination unit 115*f* has not received a master-4 determination notification packet, the processing proceeds to step S463.

[Step S462] The master determination unit 115*f* sets the master level of the CM 110 to "master 4," and the processing proceeds to "END."

[Step S463] The master determination unit 115*f* determines whether a predetermine time has elapsed without receiving a master-3 or master-4 determination notification packet after the start of the master determination processing. If the master determination unit 115*f* does not receive the master-3 determination notification packet or the master-4 determination notification packet within the predetermined time, the master determination unit 115*f* determines that the CM 110 will not serve as a master, and the processing proceeds to "END." If the predetermined time has not elapsed after the start of the master determination processing, the processing returns to step S459, and the master determination unit 115*f* waits for a master-3 or master-4 determination notification packet.

Next, the master-1 and -2 determination processing will be described in detail.

Figure 29:
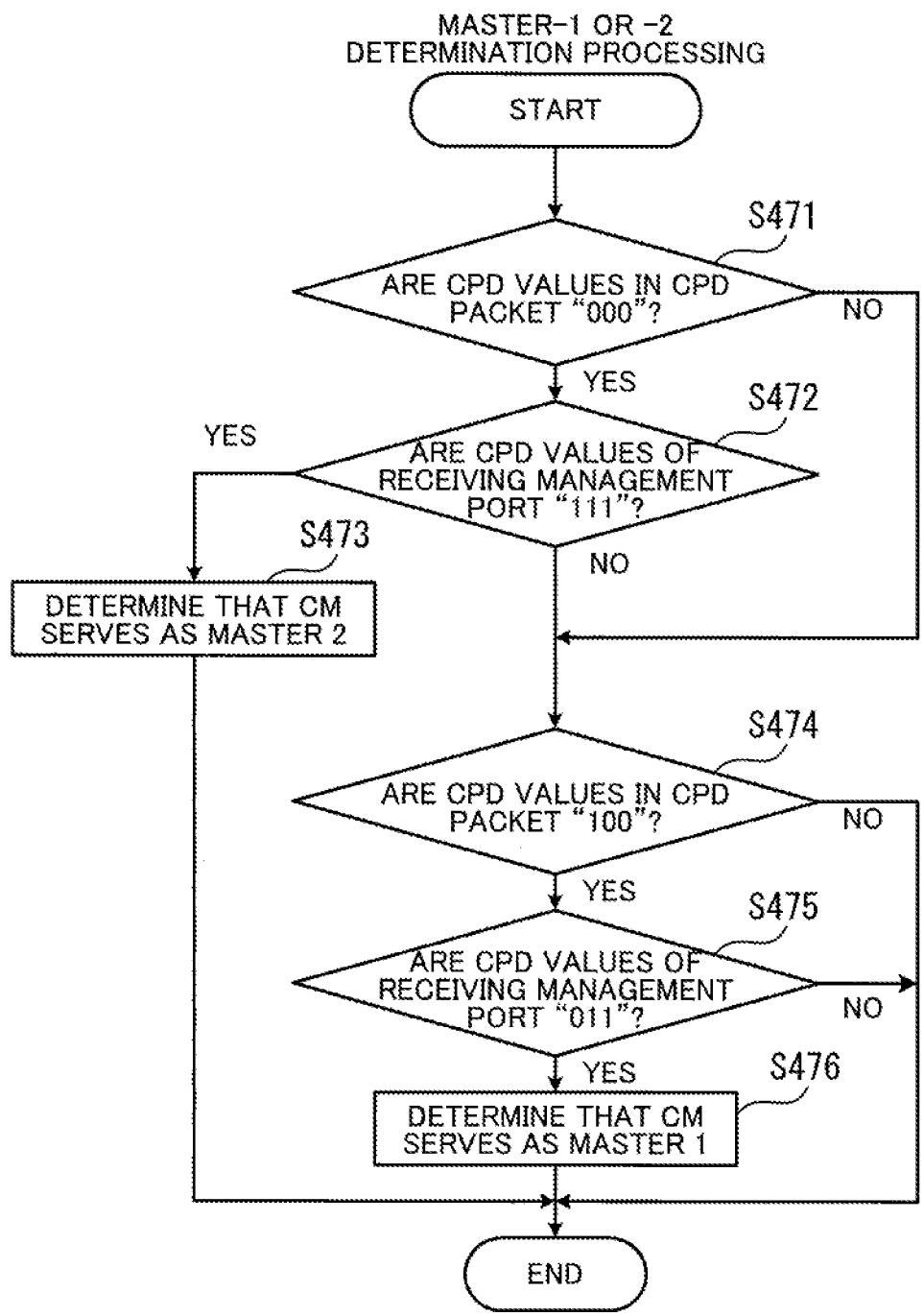
FIG. 29 is a flowchart illustrating an example of a procedure of master-1 and -2 determination processing performed by an FPGA.

FIG. 29 is a flowchart illustrating an example of a procedure of the master-1 and -2 determination processing performed by the FPGA 115. The processing illustrated in FIG. 29 will be described along with step numbers.

[Step S471] When receiving a CPD packet, the master determination unit 115*f* of the FPGA 115 determines whether the CPD values in the CPD packet are "000." If the CPD values are "000," the processing proceeds to step S472. If the CPD values are not "000," the processing proceeds to step S474.

[Step S472] The master determination unit 115*f* determines whether the CPD values of the management port that has received the CPD packet are "111." If the CPD values of the management port are "111," the processing proceeds to step S473. If the CPD values of the management port are not "111," the processing proceeds to step S474.

[Step S473] The master determination unit 115*f* determines that the CM 110 serves as the master-2 CM, and the processing proceeds to "END."

[Step S474] The master determination unit 115*f* determines whether the CPD values in the received CPD packet are "100." If the CPD values are "100," the processing proceeds to step S475. If the CPD values are not "100," the processing proceeds to "END."

[Step S475] The master determination unit 115*f* determines whether the CPD values of the management port that has received the CPD packet are "011." If the CPD values of the management port are "011," the processing proceeds to step S476. If the CPD values of the management port are not "011," the processing proceeds to "END."

[Step S476] The master determination unit 115*f* determines that the CM 110 serves as the master-1 CM, and the processing proceeds to "END."

In this way, the master determination unit 115*f* determines the master level of the CM 110. If the CM 110 is determined to serve as a master, the FPGA 115 of the CM 110 monitors the operation of the corresponding monitoring target CM.

Figure 30:
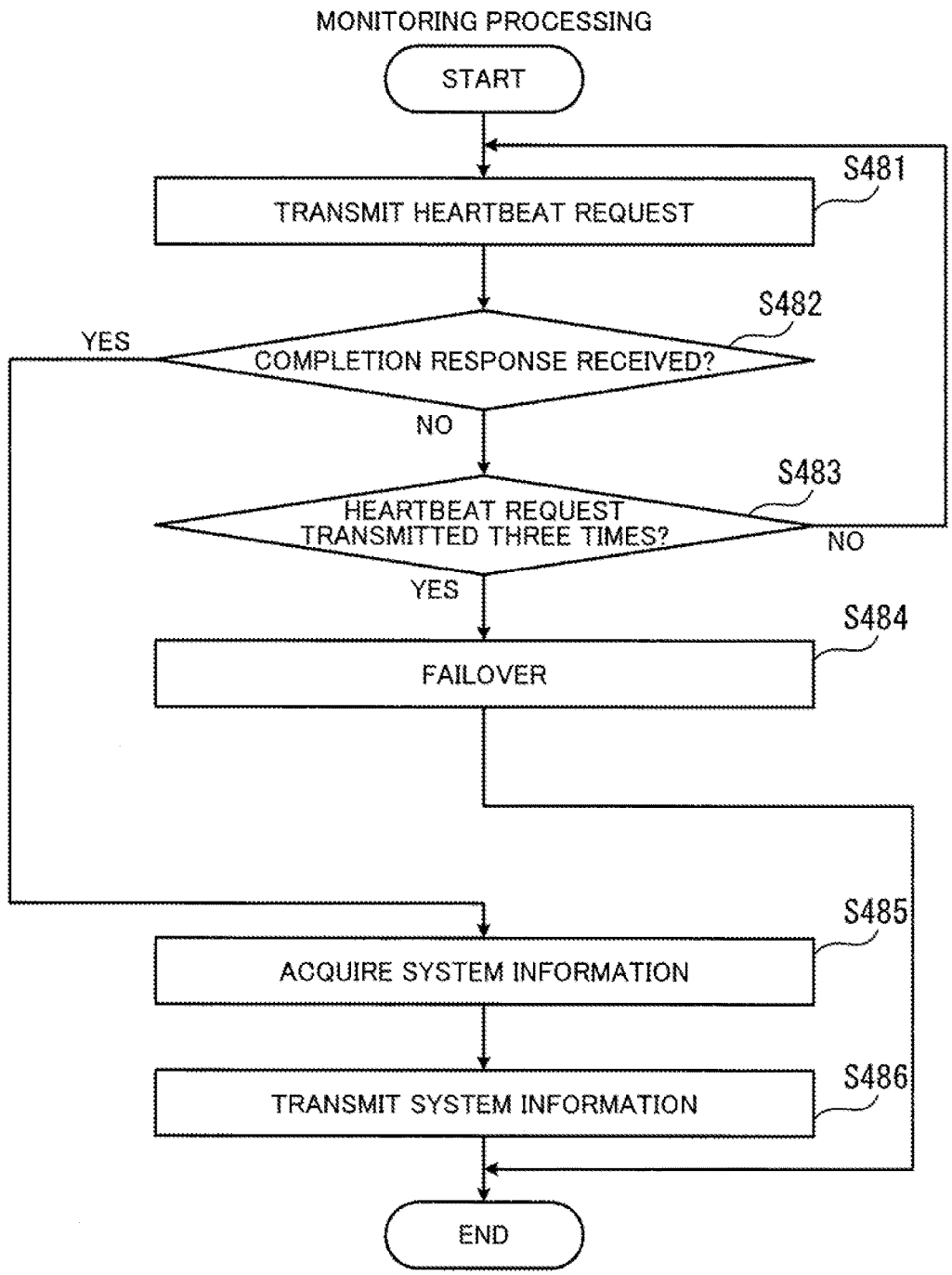
FIG. 30 is a flowchart illustrating an example of a procedure of monitoring processing performed by an FPGA.

FIG. 30 is a flowchart illustrating an example of a procedure of the monitoring processing performed by the FPGA 115. The processing illustrated in FIG. 30 will be described along with step numbers. The processing illustrated in FIG. 30 is regularly performed.

[Step S481] The monitoring unit 115g transmits a heartbeat request to its corresponding monitoring target CM.

[Step S482] The monitoring unit 115g determines whether it has received a completion response from the monitoring target CM. If the monitoring unit 115g has received a completion response, the processing proceeds to step S485. If the monitoring unit 115g does not receive a completion response within a predetermined time (for example, 200 ms), the processing proceeds to step S483.

[Step S483] The monitoring unit 115g determines whether it has transmitted a heartbeat request three times. If the monitoring unit 115g has not transmitted a heartbeat request three times, the processing returns to step S481. If the monitoring unit 115g has already transmitted a heartbeat request three times, the processing proceeds to step S484.

[Step S484] The monitoring unit 115g determines that the monitoring target CM has malfunctioned and performs failover processing on the basis of the master level of the monitoring target CM and the master level of the CM 110. For example, if the master level of the monitoring target CM is "master 1" and the master level of the CM 110 is "master 2," the monitoring unit 115g switches the master level of the CM 110 to "master 1."

[Step S485] The monitoring unit 115g acquires the system information managed by the processor 111 of the CM 110. For example, the monitoring unit 115g reads out the system information from a predetermined area in the RAM 112 or the SSD 113 and stores the read system information in the storage unit 115d.

[Step S486] The monitoring unit 115g transmits the system information to the different CM that is monitoring the CM 110. When the monitoring unit 115g receives a completion response in response to the transmitted system information, the processing proceeds to "END."

In this way, an individual FPGA is allowed to perform DC-ON control to its corresponding CM, determine whether its corresponding CM needs to serve as a master, monitor a master CM, and perform failover, without involving processing of any processor based on firmware.

The above second embodiment achieves reduction in the number of elements used in a scale-out-type storage system. More specifically, since two SVCs are eliminated, reduction of the installation space and the device cost is achieved. In addition, since the system is provided with a redundant CM management function by arranging the master-2 to master-4 CMs in addition to the master-1 CM, highly reliable CM management is achieved without needing two SVCs.

In addition, a control device that manages all the control devices is easily determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a storage apparatus;
a first control apparatus which controls the storage apparatus, which includes a first communication port satisfying, among execution conditions about predetermined management processing, a neighboring port condition about a communication port connected to an execution apparatus that performs the management processing, and which satisfies, among the execution conditions, a neighboring apparatus condition about a neighboring apparatus that neighbors the execution apparatus;
a second control apparatus which controls the storage apparatus, which includes a second communication port that satisfies, among the execution conditions, a connection port condition about a communication port connected to the neighboring apparatus, which satisfies, among the execution conditions, an execution apparatus condition about the execution apparatus, and which determines that the execution conditions are satisfied and performs the management processing when the second communication port is connected to the first communication port; and
a communication cable that connects the first communication port of the first control apparatus and the second communication port of the second control apparatus.

2. The storage system according to claim 1,
wherein the neighboring port condition is about a port number that identifies a communication port in the neighboring apparatus,
wherein the neighboring apparatus condition is about an identification number that identifies the neighboring apparatus in a first enclosure including the neighboring apparatus,
wherein the connection port condition is about a port number that identifies a communication port in the execution apparatus, and
wherein the execution apparatus condition is about an identification number that identifies the execution apparatus in a second enclosure including the execution apparatus.

3. The storage system according to claim 2,
wherein the second control apparatus acquires control information including a port number of the first port and an apparatus number of the first control apparatus from the first control apparatus via the communication cable and determines whether the neighboring port condition and the neighboring apparatus condition are satisfied, based on the control information.

4. The storage system according to claim 1, further comprising:
a third control apparatus which controls the storage apparatus, which includes a third communication port that satisfies, among monitoring execution conditions about performing processing for monitoring the second control apparatus that performs the management processing, a monitoring neighboring port condition about a communication port connected to a monitoring apparatus that performs the monitoring processing, and which satisfies, among the monitoring execution conditions, a monitoring neighboring apparatus condition about a monitoring neighboring apparatus that neighbors the monitoring apparatus;
a fourth control apparatus which controls the storage apparatus, which includes a fourth communication port that satisfies, among the monitoring execution conditions, a monitoring connection port condition about a communication port connected to the monitoring neighboring apparatus, which satisfies, among the monitoring execution conditions, a monitoring apparatus condition about the monitoring apparatus, and which determines that the monitoring execution conditions are satisfied and performs the monitoring processing when the fourth communication port is connected to the third communication port; and a monitoring apparatus connection communication cable that connects the third communication port of the third control apparatus and the fourth communication port of the fourth control apparatus.

5. The storage system according to claim 4,
wherein, when the fourth control apparatus detects a malfunction of the second control apparatus while monitoring the second control apparatus, the fourth control apparatus performs the management processing.

6. A control apparatus controlling a storage apparatus, the control apparatus comprising:

a memory holding execution conditions about predetermined management processing, the execution conditions including a neighboring port condition about a communication port connected to an execution apparatus that performs the management processing, a neighboring apparatus condition about a neighboring apparatus that neighbors the execution apparatus, a connection port condition about a communication port connected to the neighboring apparatus, and an execution apparatus condition about the execution apparatus; and a management circuit which includes a first communication port that satisfies the connection port condition and which determines that the execution conditions are satisfied and performs the management processing when the control apparatus satisfies the execution apparatus condition and when the first communication port is connected to a second communication port of a different control apparatus, the second communication port satisfying the neighboring port condition and the different control apparatus satisfying the neighboring apparatus condition.

* * * * *